United States Patent
Han et al.

(10) Patent No.: US 8,772,730 B2
(45) Date of Patent: Jul. 8, 2014

(54) PHOTON COUNTING DETECTOR TO GENERATE HIGH-RESOLUTION IMAGES AND HIGH-CONTRAST IMAGES, AND PHOTON COUNTING AND DETECTING METHOD USING THE SAME

(75) Inventors: Sang-wook Han, Busan (KR); Dong-goo Kang, Suwon-si (KR); Young-hun Sung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 13/472,885

(22) Filed: May 16, 2012

(65) Prior Publication Data

US 2013/0105701 A1 May 2, 2013

(30) Foreign Application Priority Data

Nov. 1, 2011 (KR) ........................ 10-2011-0112875

(51) Int. Cl.
*H01L 27/146* (2006.01)
*G01T 1/24* (2006.01)

(52) U.S. Cl.
USPC ............... 250/370.09; 250/394; 250/363.04; 250/363.01

(58) Field of Classification Search
USPC ................................................... 250/370.09
See application file for complete search history.

(56) References Cited

U.S. PATENT DOCUMENTS

| | | | |
|---|---|---|---|
| 7,514,688 B2 | 4/2009 | Broennimann et al. | |
| 7,626,529 B2 | 12/2009 | Robert | |
| 2003/0053587 A1 | 3/2003 | Demharter | |
| 2008/0099689 A1* | 5/2008 | Nygard et al. | 250/370.09 |
| 2009/0039273 A1 | 2/2009 | Tkaczyk et al. | |
| 2010/0270472 A1* | 10/2010 | Proksa et al. | 250/371 |
| 2010/0316184 A1 | 12/2010 | Iwanczyk et al. | |
| 2011/0036988 A1* | 2/2011 | Campbell et al. | 250/370.07 |
| 2012/0080606 A1* | 4/2012 | Van Der Wal et al. | 250/370.09 |
| 2012/0280131 A1* | 11/2012 | Spartiotis et al. | 250/366 |
| 2013/0041628 A1* | 2/2013 | Han et al. | 702/189 |

FOREIGN PATENT DOCUMENTS

| | | |
|---|---|---|
| EP | 2 560 025 A2 | 2/2013 |
| JP | 05-209967 A | 8/1993 |
| KR | 10-2011-0018995 A | 2/2011 |
| WO | WO 2006/117720 A2 | 11/2006 |
| WO | WO 2010150141 A2 * | 12/2010 |

OTHER PUBLICATIONS

Extended European Search Report issued on Aug. 6, 2013 in counterpart European Patent Application No. 1289855.5 (10 pages in English).

* cited by examiner

*Primary Examiner* — David Porta
*Assistant Examiner* — Jeremy S Valentiner
(74) *Attorney, Agent, or Firm* — NSIP Law

(57) ABSTRACT

A photon counting detector and a photon counting and detecting method using the same is provided. The photon counting detector includes readout circuits configured to count photons in multi-energy radiation incident to a sensor, the photons being counted with respect to each of a plurality of energy bands of the multi-energy radiation, the readout circuits respectively corresponding to pixels of a region onto which the multi-energy radiation is irradiated, each of the readout circuits being configured to count photons in a predetermined one of the energy bands, at least one of the readout circuits being configured to count photons in at least one of energy bands other than the predetermined one of the energy bands.

22 Claims, 10 Drawing Sheets

PHOTON COUNTING DETECTOR TO GENERATE HIGH-RESOLUTION IMAGES AND HIGH-CONTRAST IMAGES, AND PHOTON COUNTING AND DETECTING METHOD USING THE SAME

CROSS-REFERENCE TO RELATED APPLICATIONS

This application claims the benefit under 35 U.S.C. §119(a) of Korean Patent Application No. 10-2011-0112875, filed on Nov. 1, 2011, in the Korean Intellectual Property Office, the entire disclosure of which is incorporated herein by reference for all purposes.

BACKGROUND

1. Field

The following description relates to a photon counting detector and a photon counting and detecting method to generate medical images.

2. Description of Related Art

Many medical devices are currently in use that implement radiation as a tool to perform an evaluation of a subject or patient. Additional medical devices that implement radiation in this manner continue to be developed. Along with recent trends in switching from analog technology to digital technology in X-ray imaging systems using radiation, rapid advances have occurred with respect to X-ray detectors used as a core part of digital X-ray imaging systems. Digital X-ray detection methodology may be roughly classified as being either indirect or direct. The indirect methodology generates an image via sequential conversions from X-rays to visible light and then from the visible light to an electric signal. The direct methodology generates an image via direct conversion of an X-ray signal to an electric signal.

X-ray detection methods may include an integration method, in which an image signal is generated by integration of electric signals generated for a predetermined duration, and a photon counting method, in which an image signal is generated by counting incident X-ray photons. The photon counting method may create a high quality image with distinguishable X-ray energy bands via a single shooting, i.e., a small exposure to X-rays. As a result, the photon counting method has been, and continues to be, highly researched.

SUMMARY

In one general aspect, there is provided a photon counting detector, including readout circuits configured to count photons in multi-energy radiation incident to a sensor, the photons being counted with respect to each of a plurality of energy bands of the multi-energy radiation, the readout circuits respectively corresponding to pixels of a region onto which the multi-energy radiation is irradiated, each of the readout circuits being configured to count photons in a predetermined one of the energy bands, at least one of the readout circuits being configured to count photons in at least one of energy bands other than the predetermined one of the energy bands.

The general aspect of the photon counting detector may further provide that the at least one of the readout circuits is divided into N×N readout circuits that correspond to N×N pixels, respectively, each of the N×N readout circuits including a first counter configured to count the photons in the predetermined one of the energy bands, and a second counter configured to count the photons in one of the at least one of the energy bands, each of the N×N readout circuits being configured to count the photons in different ones of the at least one of the energy bands using the second counter.

The general aspect of the photon counting detector may further provide that each of the N×N readout circuits further includes a comparing unit configured to compare an electric signal converted by the sensor with a plurality of threshold values. The first counter counts the photons in the predetermined one of the energy bands based on a result of a comparison between the electric signal and a first threshold value of the plurality of threshold values from a first comparator of the comparing unit of each of the N×N readout circuits. The second counter counts the photons in the one of the at least one of the energy bands based on a plurality of results of a comparison between the electric signal and a second threshold value of the plurality of threshold values, the second counter receiving the plurality of results of the comparison from second comparators of the comparing unit of each of the N×N readout circuits.

The general aspect of the photon counting detector may further provide that the second counter counts the photons until a result of a comparison is received indicating that the electric signal converted by the sensor has amplitude that is greater than amplitude of the second threshold value.

The general aspect of the photon counting detector may further provide that each of the N×N readout circuits further includes a logic circuit configured to perform a logic operation using the plurality of results of the comparison with the second threshold value, and output a result of the logic operation to the second counter. The second counter counts the photons based on the result of the logic operation from the logic circuit.

The general aspect of the photon counting detector may further provide that the logic circuit is an OR gate.

The general aspect of the photon counting detector may further provide that each of the N×N readout circuits further includes an integrator configured to accumulate an electric signal received from the sensor that has undergone photoelectric conversion from a corresponding one of the photons, a comparator configured to compare the accumulated electric signal from the integrator with one of a plurality of threshold values, and a signal processor configured to instruct sequential switching from the one of the threshold values to another one of the threshold values according to a result of the comparing, and output digital signals that distinguish the energy bands of the photons based on results of sequential comparisons with the threshold values from the comparator. The first counter counts the photons in the predetermined one of the energy bands based on a digital signal received from the signal processor that is indicative of a result of a comparison with a first threshold value of the threshold values. The second counter counts the photons in the one of the at least one of the energy bands based on a digital signal received from the signal processor that is indicative of a result of a comparison with a second threshold value of the threshold values.

The general aspect of the photon counting detector may further provide that the signal processor is further configured to receive results of comparisons with the second threshold value from signal processors of other N×N readout circuits, and output the received results of the comparisons to the second counter.

The general aspect of the photon counting detector may further provide that the signal processor is further configured to perform a logic operation using results of comparisons with the second threshold value received from signal processors of other N×N readout circuits, and output a result of the logic operation to the second counter.

The general aspect of the photon counting detector may further provide that the logic operation is an OR operation.

In another general aspect, there is provided a photon counting and detecting method in readout circuits to count photons in multi-energy radiation incident to a sensor, the photons being counted with respect to each of a plurality of energy bands of the multi-energy radiation, the method including determining an energy band of a photon, if the determined energy band of the photon is a predetermined energy band, counting the photon in one of the readout circuits that corresponds to a pixel to which the photon has been incident, and, if the determined energy band of the photon is one of energy bands other than the predetermined energy band, counting the photon selectively and respectively in at least one of the readout circuits that corresponds to a pixel to which the photon of the one of the energy bands other than the predetermined energy band has been incident.

The general aspect of the method may further provide that the at least one of the readout circuits is divided into N×N readout circuits that correspond to N×N pixels, respectively. The counting of the photon of the one of the energy bands other than the predetermined energy band includes counting the photon in the one of the readout circuits that corresponds to the pixel to which the photon has been incident if the one of the readout circuits that corresponds to the pixel to which the photon has been incident comprises a counter that counts the photon of the one of the energy bands other than the predetermined energy band. The counting of the photon of the one of the energy bands other than the predetermined energy band further includes outputting a result of the determining of the energy band to one of the N×N readout circuits comprising the counter that counts the photon of the one of the energy bands other than the predetermined energy band, if the readout circuit that corresponds to the pixel to which the photon has been incident does not have the counter that counts the photon in the one of the energy bands other than the predetermined energy band.

The general aspect of the method may further provide that the determining of the energy band includes comparing an electric signal received by the sensor with a plurality of threshold values.

The general aspect of the method may further provide that the counting of the photon of the predetermined energy band is based on a result of a comparison with a first threshold value of a plurality of threshold values.

The general aspect of the method may further provide that the at least one of the readout circuits is divided into N×N readout circuits that correspond to N×N pixels, respectively. The counting of the photon of the one of the energy bands other than the predetermined energy band is based on a result of a logic operation using results of comparisons with a second threshold value of the threshold values, the results of the comparisons being output from the N×N readout circuits.

The general aspect of the method may further provide that the logic operation is an OR operation.

The general aspect of the method may further provide that the counting of the photon of the one of the energy bands other than the predetermined energy band is based on a result of a comparison with a second threshold value of a plurality of threshold values.

The general aspect of the method may further provide that the determining of the energy band includes accumulating an electric signal received from the sensor that has undergone photoelectric conversion from a corresponding photon, comparing the accumulated electric signal with one of a plurality of threshold values, instructing sequential switching from the one of the plurality of threshold values to an other one of the threshold values according to a result of the comparing of the accumulated electric signal, and outputting digital signals that distinguish the energy band of the photon based on results of sequential comparisons with the plurality of threshold values.

The general aspect of the method may further provide that the counting of the photon of the predetermined energy band is performed if the accumulated electric signal has amplitude that is greater than amplitude of a first threshold value of the plurality of threshold values.

The general aspect of the method may further provide that the counting of the photon of the one of the energy bands other than the predetermined energy band is performed if the accumulated electric signal has amplitude that is greater than amplitude of a second threshold value of the plurality of threshold values.

The general aspect of the method may further provide that the at least one of the readout circuits is divided into N×N readout circuits that correspond to N×N pixels, respectively. The counting of the photon of the one of the energy bands other than the predetermined energy band is based on a result of a logic operation using results of comparisons with a second threshold value of the threshold values, the results of the comparisons being output from the N×N readout circuits.

Other features and aspects may be apparent from the following detailed description, the drawings, and the claims.

Figure 1:
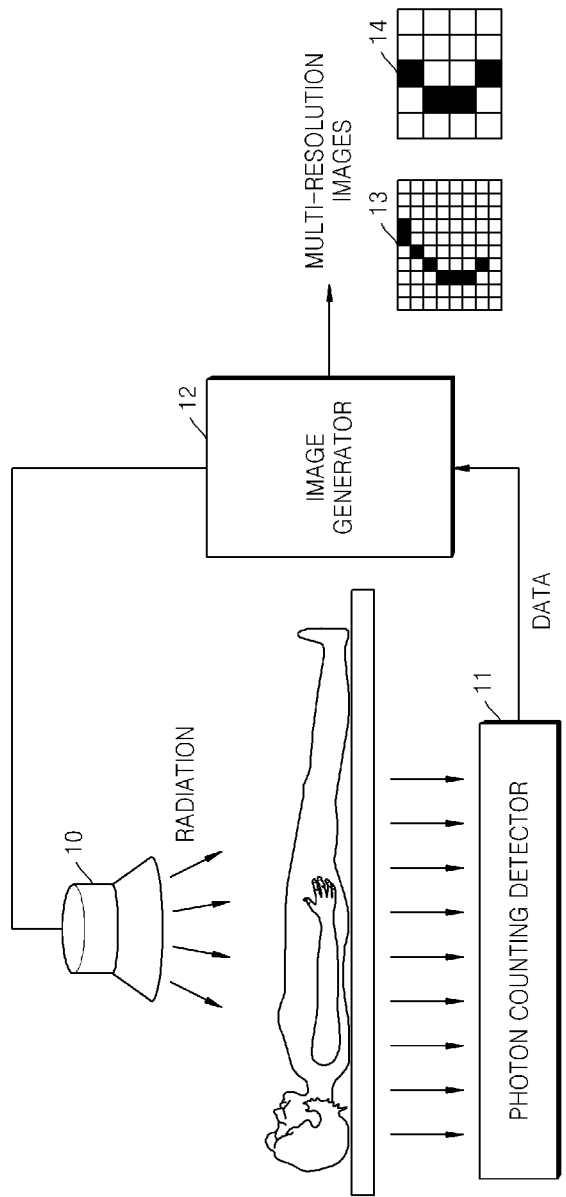
FIG. 1 is a diagram illustrating an example of a configuration of a medical imaging system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a diagram illustrating an example of a configuration of a medical imaging system. Referring to FIG. 1, the medical imaging system includes a radiation generator 10, a photon counting detector 11, and an image generator 12. The medical imaging system may use a sensor to detect multi-energy radiation, which has passed through an irradiation target, such as a body part. The medical imaging system may count photons in the detected multi-energy radiation using the sensor with respect to each energy band contained in the detected multi-energy radiation. The medical imaging system generated multi-resolution images 13 and 14 of the body part based on the counted photons.

An amount of multi-energy radiation absorption by the irradiation target depends on the type and density of the irradiation target and the energy band of the radiation. For example, bones may absorb a large amount of X-rays, while muscles may absorb less X-rays than an amount of X-rays absorbed by bones. Thus, the radiation irradiated from the radiation generator 10 may include a number of photons that is different after being transmitted through a bone from a number of photons after being transmitted through other body tissues. The number of photons for each energy band may differ accordingly. That is, the number of photons for each energy band that the radiation irradiated from the radiation generator 10 may include after being transmitted through a targeted bone may be different than a number of photons for each energy band that the radiation irradiated from the radiation generator 10 may include after being transmitted through other targeted body tissues.

The image generator 12 may generate a sharp X-ray image of body tissues corresponding to each pixel of a region onto which multi-energy radiation is irradiated by the radiation generator 10, the sharp X-ray image of body tissues being based on the counts of the photons for each energy band by the photon counting detector 11.

The radiation generator 10 generates and radiates radiation onto a patient. The radiation generated from the radiation generator 10 may be any of, for example, ultrasonic waves, α-rays, β-rays, γ-rays, X-rays, and neutron rays. In general, radiation may refer to X-rays that may produce ionizing radiation, which is harmful to the human body. For convenience of explanation, the general aspects described herein are described with emphasis on X-rays as an example; however, it may be understood by one of ordinary skill in the art that other radiation rays may be used to create an image based on data of photon counts for each energy band.

The photon counting detector 11 includes readout circuits that correspond to a region of the target to be imaged onto which multi-energy radiation is irradiated by the radiation generator 10. For example, the readout circuits may correspond to pixels of the region onto which multi-energy radiation is irradiated by the radiation generator 10, respectively.

The photon counting detector 11 outputs counts of photons conducted in the readout circuits to the image generator 12. An amount of pixels in the region onto which multi-energy radiation is irradiated by the radiation generator 10 corresponds to an amount of readout circuits in a readout chip respectively corresponding to the pixels. As a result, the image generator 12 may generate higher-resolution images. In addition, multi-energy images may be generated through counting photons in multi-energy radiation with respect to each energy band. As a result, a high-contrast image may be generated using the multi-energy band images.

A high-resolution image generated by the image generator 12 provides information necessary to detect a very small local lesion. A high-contrast image generated through appropriate image processing of the multi-energy images provides information necessary to distinguish a mass such as a tumor from neighboring soft tissues. For example, X-ray mammography involving detection of a calcification having a size in the tens of micrometers requires high-resolution images. However, due to a relatively high contrast ratio between neighboring tissues, high-contrast images are not necessary to detect the small lesion. On the other hand, to distinguish a mass such as a tumor from neighboring soft tissues, high-contrast images are necessary, while high-resolution images are not necessary due to a relatively large size of such masses. The image generator 12 may generate both a high-resolution image and a high-contrast image through just one dose of radiation, thereby enabling detection of a small lesion and a mass at the same time.

The photon counting detector 11 may implement small readout circuits to generate high-resolution images. A readout circuit disposed in an array form in the readout chip counts electric signals received from a corresponding unit sensor with respect to amplitudes of the electric signals, and outputs the electric signal count to the image generator 12. Each unit sensor, which occupies a partial region of the entire sensor, outputs an electric signal generated from the photons detected to a corresponding readout circuit of the readout chip through a unit output terminal of the unit sensor.

The electric signal received by each readout circuit from the unit sensor may be read out in either a charge integration mode or a photon counting mode. The charge integration mode uses a capacitor to integrate charges in which electric signals generated for a predetermined duration are accumulated and are read out via an analog-to-digital converter (ADC). This mode integrates electric signals generated from photons in all energy bands. As a result, the charge integration mode fails to convert the electric signals into digital signals with respect to each photon energy band.

On the other hand, in the photon counting mode, a readout circuit compares an electric signal received from a unit sensor to detect photons with a threshold value, and outputs a digital signal indicating '1' or '0'. A counter counts occurrences of '1', and outputs data in digital form. The photon counting mode compares signals generated from single photons with a predetermined threshold value whenever each signal is generated, and counts the signals. The photon counting detector 11 may be implemented using readout circuits based on the photon counting mode, where the readout circuits may count photons received from the corresponding unit sensors with respect to each photon energy band.

Figure 2:
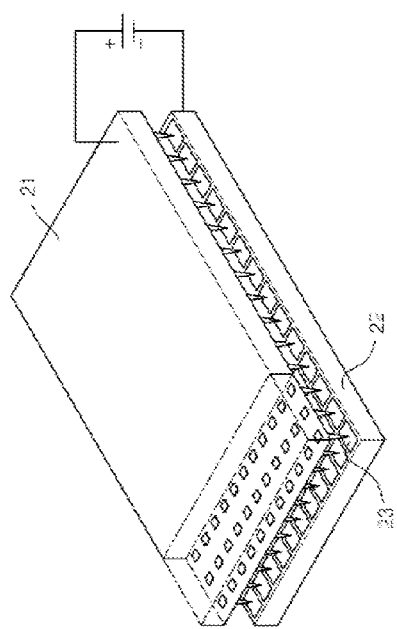
FIG. 2 is a perspective view illustrating an example of the photon counting detector of FIG. 1

FIG. 2 is a perspective view illustrating an example of the photon counting detector 11 of FIG. 1. Referring to FIG. 2, the photon counting detector 11 includes a sensor 21 and a readout chip 22. The sensor 21 may detect photons in the multi-energy radiation that have been transmitted through a target such as a body part, convert the detected photons into electric signals, and output the electric signals through unit output terminals of the sensor 21 to readout circuits 23 of the readout chip 22. The sensor 21 may correspond to a region onto which multi-energy radiation is irradiated. A region of the sensor that corresponds to each pixel of the region onto which multi-energy radiation is irradiated is referred to as a 'unit sensor'. A unit sensor converts each incident photon into an electric signal, and outputs the electric signals through a unit output terminal of the unit sensor.

The readout chip 22 may correspond in size to the region onto which multi-energy radiation is irradiated, and corresponds in size to the sensor 21. The readout chip 22 may include the readout circuits 23 that respectively correspond to the pixels of the region onto which multi-energy radiation is irradiated. Thus, the size of the region onto which multi-energy radiation is irradiated may determine the size of the readout chip 22. In order to form a greater amount of pixels having a particular size in a region onto which multi-energy radiation is irradiated, the readout circuits 23 respectively corresponding to the pixels of the region onto which multi-energy radiation is irradiated may need to be small in order to be sized to the particular size of the pixels. When the sizes of the readout circuits 12 are so reduced that the region onto which multi-energy radiation is irradiated is divided into a large plurality of pixels of the particular size, a high-resolution image may be generated with respect to the region onto which multi-energy radiation is irradiated.

Figure 3:
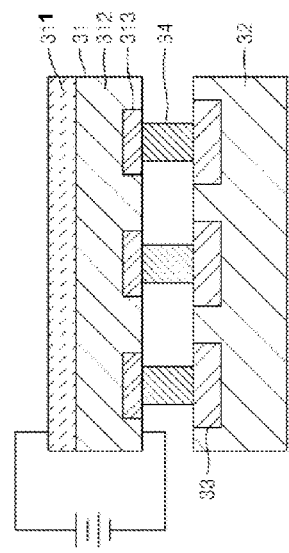
FIG. 3 is a cross-sectional view illustrating another example of the photon counting detector of FIG. 1.

FIG. 3 is a cross-sectional view illustrating another example of the photon counting detector 11 of FIG. 1. Referring to FIG. 3, the photon counting detector 11 includes a sensor 31 and a readout chip 32. The sensor 31 may detect photons, convert the detected photons into electric signals, and output the converted electric signals to readout circuits 33 of the readout chip 32, which correspond to regions of the sensor 31 through bondings 34.

When photons enter a depletion region 312 of the sensor 31, the sensor 31 may generate electron-hole pairs, which are drawn by an electric field into a quasi-neutral n-region 311 and a quasi-neutral p-region 313 so electric current may flow out of the sensor 31. For example, when a multi-energy X-ray enters the sensor 31, the sensor 31 may generate electric signals having different amplitudes with respect to energy bands of the photons in the multi-energy X-ray, and output the generated electric signals to the readout circuits 33 of the readout chip 32 through quasi-neutral p-regions 313 that respectively correspond to the unit sensors of the sensor 31. The quasi-neutral p-regions 313 are unit output terminals of unit sensors in the sensor 31. When photons are detected in the unit sensors of the sensor 31, which respectively correspond to the pixels of the region onto which multi-energy radiation is irradiated, the sensor 31 may output electric signals through the unit output terminals of the unit sensors to the readout circuits 33 of the readout chip 32.

The sensor 31 may generate the electric signals of different amplitudes with respect to the energy bands of the photons in the incident multi-energy X-ray, according to the number of photons in the incident multi-energy X-ray. Upon receiving the photons, the sensor 31 may generate the electric signals, for example, within a time interval. The time interval to generate the electric signals may be sufficient for the photon counting detector 11 to distinguish the energy bands of the photons from the input electric signals. The time interval among the electric signals generated by the sensor 31 may be insufficient for the photon counting detector 11 to distinguish the energy bands of the photons, but this is unlikely to be the case. Thus, the time interval between the electric signals has a trivial effect on generation of the entire image.

In the example of FIG. 3, although the sensor 31 includes the quasi-neutral n-regions 311, the depletion region 312, and the quasi-neural p-regions 313, it will be understood by one of ordinary skill in the art that any of a variety of sensors may be used to detect photons. In addition, although linked by bondings 34 in the example of FIG. 3, the sensor 31 and the readout chip 32 may be connected by any of a variety of methods (e.g., by vapor deposition).

The readout chip 32 is an array of the readout circuits 33 that may respectively correspond to the unit sensors of the sensor 31. The readout circuits 33 may distinguish the energy bands of the photons incident to the sensor 31 from the electric signals received from the sensor 31, which are generated from those photons in the sensor 31, count the photons in each energy band, and output the photon count to the image generator 12.

The readout chip 32 may correspond in size to the region onto which multi-energy radiation is irradiated, and the readout circuits 33 in the readout chip 32 correspond to the pixels of the region onto which multi-energy radiation is irradiated, respectively. To generate high-resolution images, a region onto which multi-energy radiation is irradiated, the region being of a particular size, may need to be divided into a greater number of pixels. As a result, the readout circuits 33 that respectively correspond to the pixels of the region onto which multi-energy radiation is irradiated need to be smaller. The image generator 12 may generate an image with respect to each pixel of the region onto which multi-energy radiation is irradiated based on the photon counts of the readout circuits 33 corresponding to each of the pixels.

The readout circuit 33 may distinguish the energy bands of photons in the incident multi-energy X-ray, output digital signals indicating the energy bands of the photons, and count the photons in each energy band from the digital signals. Whenever an electric signal is received from a corresponding unit sensor, the readout circuit 33 may compare amplitude of the electric signal with predetermined threshold values to distinguish the energy bands of the photons in the multi-energy radiation, and count the photons with respect to each energy band. For example, if a result of the comparison indicates that amplitude of the electric signal received from the corresponding unit sensor is greater than a predetermined threshold value, a corresponding counter of the readout circuit 33 may count the photons with respect to each energy band.

The bondings 34 connect the sensor 31 and the readout circuits 33 of the readout chip 32 to allow transfer of the electric signals generated in the regions of the sensor 31 to the corresponding readout circuits 33 of the readout chip 32. In the example of FIG. 3, although the sensor 31 and the readout circuits 33 of the readout chip 32 are linked by means of the bondings 34, any of a variety of methods may be used to connect the sensor 31 and the readout circuits 33 of the readout chip 32. For example, the sensor 31 may be connected to the readout chip 32 using a semiconductor process (e.g., vapor deposition). However, it will be understood by one of ordinary skill in the art that any connecting method may be used.

Figure 4:
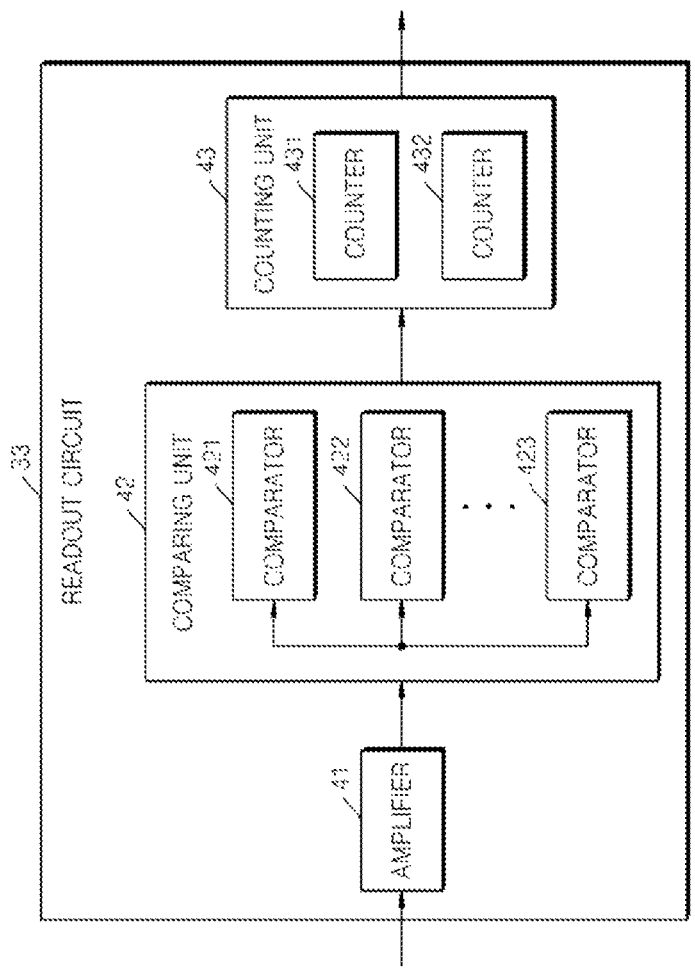
FIG. 4 is a block diagram illustrating an example of the readout circuit of FIG. 3.

FIG. 4 is a block diagram illustrating an example of the readout circuit 33 of FIG. 3. Referring to FIG. 4, the readout circuit 33 includes an amplifier 41, a comparing unit 42, and a counting unit 43. The amplifier 41 may receive and amplify an electric signal from the sensor 31, which has been converted from the photons detected by the sensor 31, and output the amplified electric signal to the comparing unit 42.

The comparing unit 42 includes comparators 421-423, which may receive the amplified electric signal from the amplifier 41, compare the amplified electric signal with predetermined threshold values, respectively, and output results of the comparisons to the counting unit 43. The comparators 421-423 of the comparing unit 42 may correspond to threshold values, respectively. The comparator 421 may compare a threshold value Vth1 with the amplified electric signal from the amplifier 41. The comparator 422 may compare a threshold value Vth2 with the amplified electric signal from the amplifier 41. The comparator 423 may compare a threshold value VthN with the amplified electric signal from the amplifier 41. In the example of FIG. 4, although only three comparators are illustrated, the comparing unit 42 may include as many comparators as a number of threshold values.

The threshold values Vth1-VthN may be set to distinguish energy bands of photons in multi-energy radiation. For example, the threshold values Vth1-VthN may be predetermined to have an order from a minimum value to a maximum value. As a result, the threshold values may serve to distinguish the energy bands of the photons in the multi-energy radiation. Moreover, after measurements are made of amplitudes of electric signals generated from the photons in the multi-energy radiation, voltage levels that distinguish these electric signals may be set as the threshold values Vth1-VthN.

Each of the comparators 421-423 may output a result of the comparison of a corresponding threshold value with the amplified electric signal from the amplifier 41 to a corresponding counter. For example, if the amplified electric signal from the amplifier 41 is larger than the threshold value Vth1, the comparator 421 may output '1' to a counter 41. If the amplified electric signal from the amplifier 41 is not larger than the threshold value Vth1, the comparator 421 may output '0' to the counter 41, or may output no signal to the counter 431. The other comparators 422-423 may operate in the same manner as the comparator 421. It will be understood by one of ordinary skill in the art that outputted signals from the comparing unit 42 indicating various results of comparisons may be in any of a variety of forms that are not limited to the above.

The counting unit 43 includes counters 431, 432. The counters 431, 432 may receive the results of comparisons from the comparing unit 42, count the photons in the multi-energy radiation for each energy band, and output a result of the count to the image generator 12.

The counters 431, 432 may receive the result of a comparison from one of the comparators 421-423, but not from the same comparator. For example, if the counter 431 receives the result of a comparison from the comparator 421, the counter 432 will not receive the result of the comparison from the comparator 421, but may receive the result of a comparison from the comparator 422 or from the comparator 423. After receiving the result of the comparison from the comparator 421, the counter 431 may also receive the result of the comparison from the comparators 422, 423 if the counter 432 has not already received the result of the comparison from the comparators 422, 423. The counters 431, 432 may receive the result of a comparison from any comparator of the readout circuit 33 and other neighboring readout circuits, but one of the counters 431, 432 cannot receive a result from a comparator that has already outputted a result to an other one of the counters 431, 432. This will now be described with reference to FIG. 5.

Figure 5:
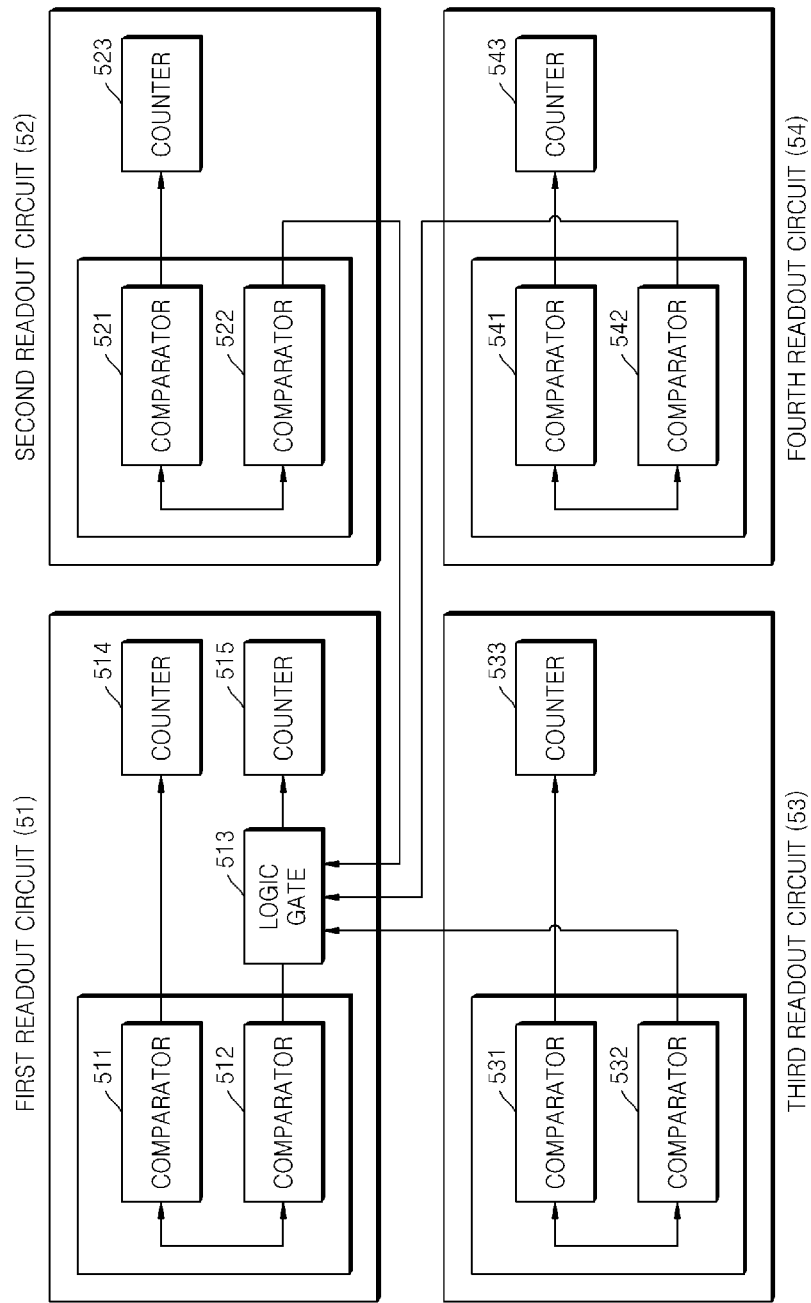
FIG. 5 is a block diagram illustrating an example of multiple readout circuits that share counters.
Figure 6:
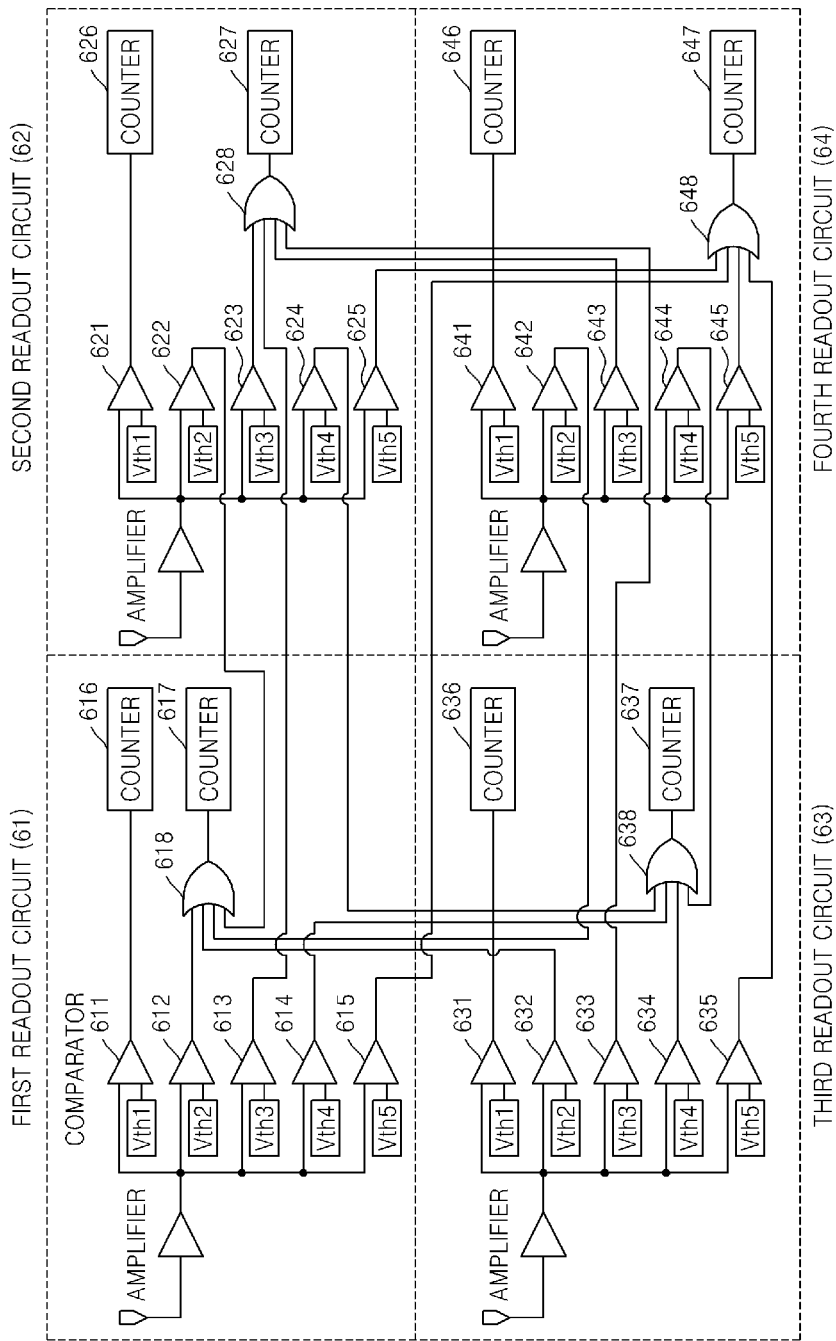
FIG. 6 is a circuit schematic diagram illustrating an example of multiple readout circuits that share counters.

FIG. 5 is a block diagram illustrating an example of readout circuits in a 2×2 array to describe counting photons incident to 2×2 pixels of a region onto which multi-energy radiation is irradiated with respect to each energy band. FIG. 5 is a simplified diagram of the readout circuits in a 2×2 array to describe counting photons with respect to each energy band, as an amplifier that the readout circuit may include is not shown, and only two comparators are shown in each readout circuit. In the example illustrated in FIG. 5, although a logic gate 513 is shown only in a first readout circuit 51, this simplification is to facilitate understanding of a general aspect using two comparators. In some aspects, the first to fourth readout circuits 51-54 may each include a logic gate, as illustrated in the example of FIG. 6.

When the region onto which multi-energy radiation is irradiated is divided into pixels in a 2×2 array, the photon counting detector 11 may include readout circuits in a 2×2 array that correspond to the 2×2 pixels, respectively. Hereinafter, an example of an operation of the 2×2 readout circuits will be described, which may also apply to readout circuits in an N×N array.

The first to fourth readout circuits 51-54 may count photons in a predetermined energy band and photons in one or more different energy bands excluding the predetermined energy band. Each of the first to fourth readout circuits 51-54 includes a first counter to count photons in the predetermined energy band. Each of the first to fourth readout circuits 51-54 may count photons in a predetermined energy band based on a result of a comparison by the comparators 511, 521, 531, and 541.

The first readout circuit 51 includes another counter 515 to count photons in different energy bands, excluding the predetermined energy band, based on results of comparisons received from the first to fourth readout circuits 51-54. The counter 515 of the first readout circuit 51 counts the photons in a second energy band incident to the 2×2 pixels that correspond to the first to fourth readout circuits 51-54, respectively. This count indicates that the photons in the second energy band have been incident to the 2×2 pixels, but may not indicate which pixel(s) those photons have been incident thereto. Compared with an image generated based on the counts of the photons in the predetermined energy band output from all the 2×2 readout circuits, an image generated based on the count of the photons in the second energy band output from only one of the 2×2 readout circuits may have a lower resolution by about ¼. That is, an image from the photons of the second energy band may be identical for the 2×2 pixels.

The counter 515 of the first readout circuit 51 may perform counting based on the results of comparisons by the comparators 512, 522, 532, and 542 of the first to fourth readout circuits 51-54. The comparators 512, 522, 532, and 542 may compare the amplified electric signal from the amplifier 41 (shown in FIG. 4) with a threshold value Vth2, and output results of the comparisons to the counter 515 of the first readout circuit 51. For example, if a signal of, for example, '1', indicative of the amplified electric signal from the amplifier 41 being greater than the threshold value Vth2, is received twice, the counter 515 of the first readout circuit 51 may count these signals twice. The threshold value Vth1 is a threshold value that the comparators 511, 521, 531, and 541 may compare with the amplified electric signal from the amplifier 41, while the threshold value Vth2 is a threshold value that the comparators 512, 522, 532, and 542 may compare with the amplified electric signal from the amplifier 41.

The first readout circuit 51 may include a logic gate 513 to perform a logic operation on signals received from the comparators 512, 522, 532, and 542 that are respectively of the first to fourth readout circuits 51-54. If the first readout circuit 51 includes a logic gate 513, the comparators 512, 522, 532, and 542 of the first to fourth readout circuits 51-54 may output results of comparisons to the logic gate 513 of the first readout circuit 51. The logic gate 513 may be part of a logic circuit, and may perform, for example, an AND, OR, or NOR operation. In another aspect, the logic gate 513 may be part of an electronic circuit including a plurality of logic gates. For example, if the logic gate 513 is an OR gate, the counter 515 of the first readout circuit 51 may perform counting when a signal of '1' is received from one or more of the comparators 512, 522, 532, and 542 of the first to fourth readout circuits 51-54.

In the example of FIG. 5, each of the second to fourth readout circuits 52-54 may include only the counters 523, 533, and 543, respectively. As a result, each of the second to fourth readout circuits 52-54 may share the counter 515 with the first readout circuit 51. This may reduce the size of a readout circuit relative to when each readout circuit includes two counters. The use of readout circuits having a reduced size may ensure that a region onto which multi-energy radiation is irradiated is divided into smaller pixels that respectively correspond to the readout circuits. The region onto which multi-energy radiation is irradiated and having a particular area may be divided into a large number of pixels so that a high-resolution image may be generated using photon counts with respect to each of the pixels. The image generator 12 may generate a high-contrast image using data obtained by counting photons with respect to each energy band in each pixel of the region onto which multi-energy radiation is irradiated. The image generator 12 may receive the photon counts for each energy band from the photon counting detector 11, and generate an image for each photon energy band based on the photon counts.

The image generator 12 may generate a high-contrast image by using the image generated for each energy band. A degree of photon transmission through a particular body part may depend on energy bands of the photons. Therefore, use of the transmission degrees of photons in different energy bands may generate a high-contrast image. The sharing of the counter 515 of the first readout circuit 51 with the other readout circuits may reduce the size of the photon counting detector 11. As a result, a high-resolution image may be generated using the photon counts in the first energy band from the readout circuits. Using photon data for each photon energy band, which is acquired based on the photon counts in the second energy band incident to the 2×2 pixels by the counter 515 of the first readout circuit 51, and the photon counts in the first energy band from the first to fourth readout circuits 51-54, the image generator 12 may generate a high-contrast image.

In the example illustrated in FIG. 5, although each readout circuit includes two comparators, each readout circuit may include more than two comparators. In another aspect, each readout circuit may include four comparators and two counters. In this aspect, the first readout circuit 51 may count the photons in the second energy band based on a result of a comparison of the amplified electric signal from the amplifier 41 with the threshold value Vth2, the second readout circuit 52 may count the photons in the third energy band based on a result of a comparison of the amplified electric signal from the amplifier 41 with a threshold value Vth3, the third readout circuit 53 may count the photons in the fourth energy band based on a result of a comparison of the amplified electric signal from the amplifier 41 with a threshold value Vth4, and the fourth readout circuit 54 may count the photons in the fifth energy band based on a result of a comparison of the amplified electric signal from the amplifier 41 with a threshold value Vth5.

FIG. 6 is a circuit schematic diagram illustrating an example of a photon counting detector, in which readout circuits, an example of which is illustrated in FIG. 3, share counters. Referring to FIG. 6, each of first to fourth readout circuits 61-64 includes two counters. The first readout circuit 61 includes counters 616 and 617 and comparators 611-615. The second readout circuit 62 includes counters 626 and 627 and comparators 621-625. The third readout circuit 63 includes counters 636 and 637 and comparators 631-635. The fourth readout circuit 64 includes counters 646 and 647 and comparators 641-645.

The first to fourth readout circuits 61-64 share the counters 617, 627, 637, and 647, respectively, with the other readout circuits. The counter 617 of the first readout circuit 61 may perform counting based on results of comparisons from the comparators 612, 622, 632, and 642. The counter 627 of the second readout circuit 62 may perform counting based on results of comparisons from the comparators 613, 623, 633, and 643. The counter 637 of the third readout circuit 63 may perform counting based on results of comparisons from the comparators 614, 624, 634, and 644. The counter 647 of the fourth readout circuit 64 may perform counting based on results of comparisons from the comparators 615, 625, 635, and 645.

Each of the first to fourth readout circuits 61-64 includes a logic circuit 618, 628, 638, and 648 to perform an operation on signals from corresponding comparators, and output a result of the operation to the respective counters 617, 627, 637, and 647. The logic circuit may be an electronic circuit to perform a logic operation on signals received from corresponding comparators of the first to fourth readout circuits 61-64. For example, the first readout circuit 61 includes a logic circuit 618 that performs a logic operation on signals received from the comparators 612, 622, 632, and 642, and outputs a result of the logic operation to the counter 617. The comparators 612, 622, 632, and 642 of the first to fourth readout circuits 61-64 may output the results of comparisons to the logic circuit 618, which may then perform a logic operation based on the results of the comparisons received from the comparators 612, 622, 632, and 642, and output a result of the logic operation to the counter 617 of the first readout circuit 61. For example, if the logic circuit 618 is an OR gate, when a signal of '1', which is indicative of an amplified electric signal from an amplifier being greater than a second threshold value Vth2, is received from one or more of the comparators 612, 622, 632, 642 of the first to fourth readout circuits 61-64, the first logic circuit 618 may output '1' to the counter 617 of the first readout circuit 61.

In the example illustrated in FIG. 6, although the four neighboring readout circuits 61-64 share the counters 617, 627, 637, and 647, N neighboring readout circuits may share counters. When N neighboring readout circuits share counters, each of the readout circuits may include (N+1) comparators and one of these comparators may output a result of a comparison to a counter of the corresponding readout circuit. Subsequently, the counter may output a photon count in a predetermined energy band to generate high-resolution images. The other counter of the corresponding readout circuit may output a photon count in the other different energy bands, excluding the predetermined energy band, to generate high-contrast images. The different energy bands may differ between the readout circuits. Photons may have N different energy bands. The N neighboring readout circuits may count photons in the N different energy bands, respectively. Since each of the N readout circuits includes a counter to perform counting based on a result of a comparison received from one of the (N+1) comparators, the image generator 12 may generate a high-resolution image based on the photon count in a specific energy band received from each readout circuit. Since each of the N readout circuits includes another counter to count photons in a different energy band, the image generator 12 may generate an image for each energy band based on photon counts in the different energy band received from the readout circuits. Each readout circuit corresponding to one pixel does not include multiple counters to count photons in the entire range of energy bands, and, rather, includes a counter to count photons in a different energy band that differs from the energy bands of photons counted in the other readout circuits. Thus, the readout circuit may have a reduced size. This may lead to size reduction of pixels that correspond to the readout circuits, respectively, thus enabling generation of a high-resolution image.

In the example illustrated in FIG. 6, since the four readout circuits share the counters 617, 627, 637, and 647, in order to use a reduced number of counters across the four readout circuits, each comparator in the readout circuits need not be connected to a corresponding counter. An image generated based on photon counts from the counters 617, 627, 637, and 647 may have a ¼ resolution of an image created based on photon counts from the counters 616, 626, 636, and 646. For example, a photon count in a second energy band from the counter 617 of the first readout circuit 61 is the count of photons incident onto pixels of a region onto which multi-energy radiation is irradiated, which corresponds to the first to fourth readout circuits 61-64. Thus, when the image generator 12 generates an image for the pixels that corresponds to the first to fourth readout circuits 61-64 based on the photon count in the second energy band from the counter 617 of the first readout circuit 61, the generation of the same image for each four pixels may lead to a ¼ resolution as compared with when compared with when a different image is generated for each pixel.

The shared counters 617, 627, 637, and 647 output photon counts in different energy bands, so that the image generator 12 may generate four images having a ¼ resolution, and generate a high-contrast image using the four images. The four images are from the different energy bands of photons. That is, these different images may be generated because the degree of transmission of radiation through a body part may vary depending on the energy bands of photons. Through an analysis of these characteristics, the image generator 12 may generate a high-contrast image. With the construction of the readout circuits as illustrated in FIG. 6, the image generator 12 may generate a high-resolution image based on photon count in a predetermined energy band from each readout circuit, and may generate an image for each energy band based on a photon count in a different energy band from each readout circuit that includes a shared counter, and generates a high-contrast image by using the images for the different energy bands.

The image generator 12 may receive the photon count in the predetermined energy band from each readout circuit, and generate an image for each pixel corresponding to each readout circuit. The image generator 12 receives the result of count of photons in the different energy band, excluding the predetermined energy band, and generates a same image for pixels of the region onto which multi-energy radiation is irradiated that respectively correspond to the readout circuits that share a counter with each other. The image generator 12 receives the photon count in the different energy band excluding the predetermined energy band from one readout circuit, but generates the same image for the entire pixels of the region onto which multi-energy radiation is irradiated that correspond to the multiple readout circuits, respectively.

Figure 7:
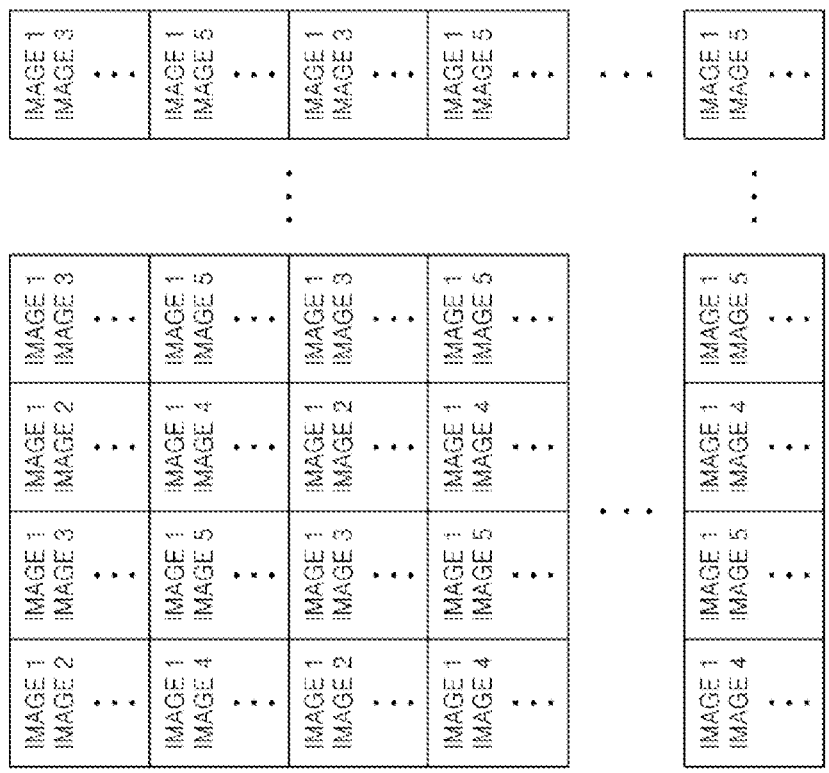
FIG. 7 is a diagram illustrating an example of describing generation of an image for each pixel by a photon counting detector.

FIG. 7 is a diagram illustrating an example of describing generation of an image for each pixel by a photo counting detector, based on the photon counts. The example illustrated in FIG. 7 discloses the generation of images for 2×2 pixels by the image generator 12. Images 1 to 5 are the images generated by the image generator 12 for each pixel. Each readout circuit of the photon counting detector 11 outputs the photon counts to the image generator 12 to generate images. The image generator 12h then generates medical images for each pixel by using the photon counts received from the readout circuits. Referring to FIG. 7, the image generator 12 receives the result of a photon count in a predetermined energy band from each readout circuit and generates a first image for each pixel based on the photon count in the predetermined energy band.

The image generator 12 receives the photon counts in second to fifth energy bands from the readout circuits, and generates second to fifth images of the second to fifth energy bands for each of the pixels that correspond to the readout circuits based on the photon counts in the second to fifth energy bands. The 2×2 readout circuits count the photons in the second to fifth energy bands, respectively, and the image generator 12 receives the photon counts from the 2×2 readout circuits and generates the second to fifth images for the entirety of the 2×2 pixels that correspond to the 2×2 readout circuits, respectively. For example, when photons in the second energy band are incident to the 2×2 pixels in a region onto which multi-energy radiation is irradiated, one of the 2×2 readout circuits that respectively corresponds to the 2×2 pixels counts the photons in the second energy band incident to the 2×2 pixels, and outputs a photon count to the image generator 12. The image generator 12 generates the second image of the second energy band for the entirety of the 2×2 pixels based on the received photon count. Although only one of the 2×2 readout circuits counts the photons in the second energy band, the generated second image is for the entirety of the 2×2 pixels that correspond to the 2×2 readout circuits, respectively. Since the same second image is generated for each of the 2×2 pixels, the resolution is a ¼ resolution as compared with when different images are generated for the 2×2 pixels, respectively. Although only the generation process of the second image has been described above, the third to fifth images may be generated in the same manner as is the second image, and, thus, may each have a ¼ resolution. The first image the image generator 12 generates is a full resolution image, while the second to fifth images are ¼ resolution images.

The image generator 12 may generate a high-contrast image by using the first to fifth images. A degree of transmission of radiation varies, even for a same body part, depending on the energy band of the radiation. Thus, images of different photon energy bands may be generated even for the same body part through which the radiation has been transmitted. The image generator 12 may generate a high-contrast image based on a result of analysis of the images of different energy bands.

Figure 8:
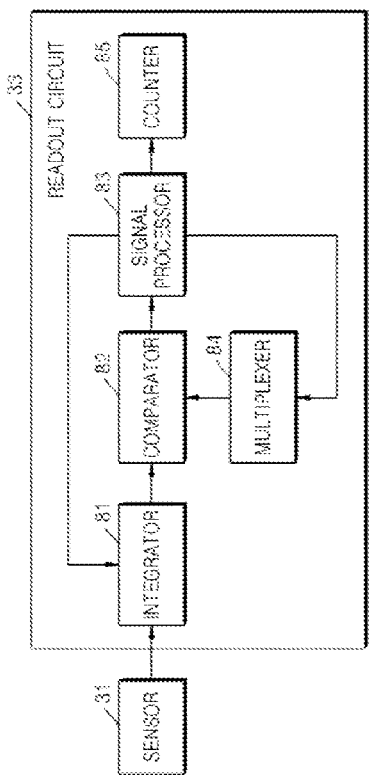
FIG. 8 is a block diagram illustrating an example of the readout circuit of FIG. 3.

FIG. 8 is a block diagram illustrating an example of the readout circuit 33 of FIG. 3. Referring to FIG. 8, the readout circuit 33 includes an integrator 81, a comparator 82, a signal processor 83, a multiplexer 84, and a counter 85. The integrator 81 may accumulate the electric signals received from the sensor 31, which have been converted from the photons detected by the sensor 31, and output an accumulated signal to the comparator 82. The integrator 81 may accumulate the electric signals input from the sensor 31 until a reset command is received from the signal processor 83, and restore the accumulated electric signal back to the original electric signals as they were before the accumulation when the reset command is received from the signal processor 83. Until the reset command is received, the integrator 81 may maintain a voltage level of the accumulated electric signal constant at an output terminal, and continue to output the constant voltage level to the comparator 82. Thus, the integrator 81 may output a non-pulsed signal, i.e., a signal that is invariant in amplitude, such as a DC voltage.

The comparator 82 may compare the accumulated electric signal from the integrator 81 with a threshold value input from the multiplexer 84, and output a result of the comparison to the signal processor 83. The threshold value is a predetermined voltage level to divide the entire energy band of photons in the multi-energy radiation into two or more energy bands. Thus, use of more threshold values may allow fine division into more photon energy bands to detect the photons for each energy band.

The result of the comparison that the comparator 82 outputs to the signal processor 83 may indicate whether the accumulated electric signal from the integrator 81 is greater in amplitude than a threshold value. For example, the comparator 82 may output '1' if the accumulated electric signal from the integrator 81 is greater than a threshold value, and may output '0' if the accumulated electric signal from the integrator 81 is less than the threshold value. Although, in this example, the signal processor 83 outputs '1' if the accumulated electric signal is greater in amplitude than a threshold value and outputs '0' if less, the opposite may be possible.

The comparator 82 may compare the accumulated electric signal from the integrator 81 with the threshold values input from the multiplexer 84 in sequence. For example, the comparator 82 may compare the accumulated electric signal from the integrator 81 with a threshold value input from the multiplexer 84, and output a result of the comparison to the signal processor 83. When a next threshold value is received from the multiplexer 84, the comparator 82 may compare the accumulated electric signal from the integrator 81 with the next threshold value, and output a result of the comparison to the signal processor 83. The comparator 82 may output a result of a comparison to the counting unit 43 when the threshold value is shifted from one to another. Thus, amplitude of the accumulated electric signal from the integrator 81 may be identified using only one comparator by comparison with several threshold values in sequence.

Since the integrator 81 may maintain a voltage level of the accumulated electric signal, which is continuously output to the comparator 82, constant at the output terminal thereof, the comparator 82 may compare the accumulated electric signal input from the integrator 81 with the threshold values input from the multiplexer 84 in sequence at a relatively slow operation rate to when a pulsed signal is input to the comparator 82. If a pulsed signal is input from the integrator 81, the comparator 82 may need to operate at a higher rate to complete a comparison before the pulsed signal falls to a predetermined voltage level or less. However, in the example illustrated in FIG. 8, while the integrator 81 maintains the voltage level of the accumulated electric signal constant until a reset command is received from the signal processor 83, the comparator 82 may continue to receive the accumulated electric signal having the constant voltage level from the integrator 81 and compare the accumulated electric signal with the threshold values in sequence. In general, a relatively high-rate comparator may need a large amount of current relative to a low-rate comparator, and be severe in terms of power consumption. Since the accumulated electric signal having a constant voltage level is continuously input from the integrator 81 to the comparator 82, the comparator 42 may not need to operate at a high rate, and, thus, may operate with less current and reduced power consumption.

The signal processor 83 may receive the results of the sequential comparisons of the accumulated electric signal output from the integrator 81 with the threshold values from the comparator 82, and output digital signals indicating the energy bands of the photons in the multi-energy radiation to the counter 85. As a result of a comparison by the comparator 82, if the accumulated electric signal from the integrator 81 has a greater amplitude than a threshold value, the signal processor 83 instructs the multiplexer 84 to output a next threshold value to the comparator 82, and outputs a digital signal indicating that amplitude of the accumulated electric signal is greater than the threshold value to the counter 85. Because of a comparison with the new threshold value, if the accumulated electric signal from the integrator 81 has greater amplitude than the new threshold value, the above-described operations are repeated. The multiplexer 84 may sequentially output the threshold values to the comparator 82 in descending order, i.e., from the largest threshold value to the smallest. On the other hand, as a result of the comparison with the new threshold value, if the accumulated electric signal from the integrator 81 has amplitude that is less than amplitude of the new threshold value, the signal processor 83 outputs a digital signal indicating that amplitude of the accumulated electric signal is less than amplitude of the new threshold value to the counter 85. If the accumulated electric signal from the integrator 81 has amplitude that is less than amplitude of the new threshold value, the signal processor 83 instructs the integrator 81 to be reset and the multiplexer 84 to output the least threshold value to the comparator 82. If the accumulated electric signal has amplitude that is equal to amplitude of a threshold value, the accumulated electric signal is considered to have amplitude that is greater than amplitude of the threshold value. The signal processor 83 may receive the results of the comparisons of the accumulated electric signal output from the integrator 81 with the threshold values from the comparator 82. The results of the comparisons input from the comparator 82 indicate if the accumulated electric signal from the integrator 81 is greater than a threshold value, or vice versa. For example, the signal processor 83 may receive '1' from the comparator 82 if the accumulated electric signal from the integrator 81 is greater than a threshold value, and '0' from the comparator 82 if the accumulated electric signal from the integrator 41 is less than a threshold value. In the example illustrated in FIG. 8, although the signal processor 83 is described as receiving '1' from the comparator 82 if the accumulated electric signal is greater than a threshold value, the signal processor 83 may operate in the opposite manner.

The signal processor 83 may output a corresponding digital signal to the counter 85 depending on which threshold value has been compared with the accumulated electric signal from the integrator 81 to obtain the result of the comparison received from the comparator 82. If the accumulated electric signal from the integrator 81 is less than a threshold value that corresponds to an energy band of photons, the signal processor 83 outputs a digital signal to the counter 85 indicating that the accumulated electric signal is less than the corresponding threshold value. If the accumulated electric signal from the integrator 81 is greater than a threshold value that corresponds to an energy band of photons, the signal processor 83 outputs a digital signal to the counter 85 indicating that the accumulated electric signal is greater than the corresponding threshold value. That is, the signal processor 83 may be aware of which threshold value has been compared to obtain the result of the comparison received from the comparator 82 by control of the multiplexer 84, and output digital signals to the counter 85 indicating the results of the comparisons between the accumulated electric signal and the threshold values corresponding to the energy bands of photons.

The signal processor 83 may instruct the integrator 81 to be reset to clear the electric signal accumulated by the integrator 81. That is, once amplitude of the accumulated electric signal from the integrator 81 is identified through the comparison described above, the signal processor 83 instructs the integrator 81 to be reset to begin a new accumulation of electric signals incoming to the integrator 81.

For example, assuming that the accumulated electric signal from the integrator 81 is denoted by Vin, and the threshold values sequentially output from the multiplexer 84 are denoted by Vthd, Vth_low, Vth_mid, and Vth_high, Vthd may indicate the threshold value having amplitude that corresponds to a leakage current or noise caused by the sensor 31, and Vth_low, Vth_mid, and Vth_high may indicate threshold values that respectively correspond to the energy bands of photons. If the accumulated electric signal Vin is less than the threshold value Vthd, it is unclear if the accumulated electric signal Vin is a leakage current or noise caused by the sensor 31, or an electric signal from photons. In this case, the signal processor 83 does not instruct the integrator 81 to be reset to allow the accumulation of electric signals input to the integrator 81 to continue, and the multiplexer 84 to switch to a next threshold value.

If the accumulated electric signal Vin is greater than the threshold value Vthd, which means that the accumulated electric signal Vin is an electric signal from photons, the signal processor 83 does not instruct the integrator 81 to be reset and instructs the multiplexer 84 to switch to the threshold value Vth_low from the threshold value Vthd so that the comparator 82 compares the accumulated electric signal Vin with the threshold value Vthd_low.

If the accumulated electric signal Vin is less than the threshold value Vth_low, the signal processor 83 instructs the integrator 81 to be reset and instructs the multiplexer 84 to switch to the threshold value Vthd so that the comparator 82 compares the accumulated electric signal Vin with the threshold value Vthd. The signal processor 83 outputs a digital signal indicating that the accelerated electric signal Vin is less than the threshold value Vth_low to the counter 85.

If the accumulated electric signal Vin is greater than the threshold value Vth_low, which means that the accumulated electric signal Vin is an electric signal from photons, the signal processor 83 does not instruct the integrator 81 to be reset and instructs the multiplexer 84 to switch the threshold value Vth_low to the threshold value Vth_mid, so that the comparator 82 compares the accumulated electric signal Vin with the threshold value Vth_mid. The signal processor 83 outputs a digital signal indicating that the accelerated electric signal Vin is greater than the threshold value Vth_low to the counter 85.

If the accelerated electric signal Vin is less than the threshold value Vth_mid, the signal processor 83 instructs the integrator 81 to be reset and instructs the multiplexer 84 to switch the threshold value Vth_mid to the threshold value Vthd. The signal processor 83 outputs a digital signal indicating that the accelerated electric signal Vin is less than the threshold value Vth_mid to the counter 85.

If the accelerated electric signal Vin is greater than the threshold value Vth_mid, the signal processor 83 does not instruct the integrator 81 to be reset and instructs the multiplexer 84 to switch the threshold value Vth_mid to the threshold value Vth_high so that the comparator 82 compares the accelerated electric signal Vin with the threshold value Vth_high. The signal processor 83 outputs a digital signal indicating that the accelerated electric signal Vin is greater than the threshold value Vth_mid to the counter 85.

If the accelerated electric signal Vin is less than the threshold value Vth_high, the signal processor 83 instructs the integrator 81 to be reset and instructs the multiplexer 84 to switch the threshold value Vth_high to the threshold value Vthd. The signal processor 83 outputs a digital signal indicating that the accelerated electric signal Vin is less than the threshold value Vth_high to the counter 85.

If the accelerated electric signal Vin is greater than the threshold value Vth_high, the signal processor 83 instructs the integrator 81 to be reset and instructs the multiplexer 84 to switch the threshold value Vth_high to the threshold value Vthd. The signal processor 83 outputs a digital signal indicating that the accelerated electric signal Vin is greater than the threshold value Vth_high to the counter 85.

The threshold values Vthd, Vth_low, Vth_mid, and Vth_high may be from the least to the greatest in this order: that is, Vthd<Vth_low<Vth_mid<Vth_high. Vthd is the least value of these threshold values. Although the above example describes the use of four threshold values, an arbitrary number N of threshold values may be used, in which any of these threshold values excluding ones that are smaller than the least threshold value Vthd are sequentially compared with the accelerated electric signal Vin. As a result, if the accumulated electric signal Vin is the least among those threshold values that are indicative of the different energy bands of photons, the signal processor 83 may instruct the integrator 81 to be reset. That is, if the accelerated electric signal Vin is less than any of the threshold values to distinguish the energy bands of photons, the counting unit 83 may instruct the integrator 81 to be reset.

The threshold value Vthd is a threshold value indicative of whether the accumulated electric signal from the integrator 81 is a leakage current or noise caused by the sensor 31. Amplitude of a leakage current caused by the sensor 31 may be obtained by measuring amplitude of a current generated by the sensor 31 alone in a non-radiation condition. The threshold value Vthd may be a voltage level previously set according to the measured amplitude of the leakage current, which may be compared with the accumulated electric signal from the integrator 81 to determine that the accumulated electric signal from the integrator is from a leakage current caused by the sensor 31, rather than from photons in the radiation.

The threshold values Vth_low, Vth_mid, and Vth_high are voltage levels previously set to distinguish several energy bands of the photons. These voltage levels may be set based on measurements of the amplitudes of electric signals that the sensor 31 generates according to the different energy bands of the photons, so that the energy bands of the photons detected by the sensor 31 may be divided.

Digital signals the signal processor 83 outputs to the counter 85 based on the results of the comparisons from the comparator 82 are as follows. OUT_low="0" is a digital signal indicative of the accumulated electric signal from the integrator 81 being less than the threshold value Vth_low, and OUT_low="1" is a digital signal indicative of the accumulated electric signal from the integrator 81 being greater than the threshold value Vth_low. OUT_mid="0" is a digital signal indicative of that the accumulated electric signal from the integrator 81 is less than the threshold value Vth_mid, and OUT_mid="1" is a digital signal indicative of the accumulated electric signal from the integrator 81 being less than the threshold value Vth_mid. OUT_high="0" is a digital signal indicative of that the accelerated electric signal from the integrator 81 is less than the threshold value Vth_high, and OUT_high="1" is a digital signal indicative of the accelerated electric signal from the integrator 81 being greater than the threshold value Vth_high. the above examples, although "1" and "0" are described to be indicative of relatively high and low levels, the opposite is also possible. It will be understood by one of ordinary skill in the art that signals to output the results of comparisons may be in any of a variety of forms.

The multiplexer 84 may sequentially output the threshold values, which are switched from one to another according to a command from the signal processor 83, to the comparator 82. The multiplexer 84 outputs the threshold value Vthd to the comparator 82. If the accelerated electric signal from the integrator 81 is greater than the threshold value Vthd, the multiplexer 84 outputs a next threshold value Vth_low to the comparator 82 according to a command from the signal processor 83. If the accumulated electric signal from the integrator 81 is greater than the threshold value Vth_low, the multiplexer 84 outputs a next threshold value Vth_mid to the comparator 82 according to a command from the signal processor 83. These processes are repeated if the accelerated electric signal from the integrator 81 is greater than a threshold value, until the multiplexer 84 outputs the threshold value Vth_high.

The counter 85 may count photons with respect to each energy band according to the digital signals received from the signal processor 83. The counter 85 may receive digital signals indicative of the different amplitudes of the accumulated electric signals from the integrator 81. For example, the digital signals received from the signal processor 83 may include OUT_low="0", OUT_low="1", OUT_mid="0", OUT_mid="1", OUT_high="0", and OUT_high="1".

The counter 85 may include three counters Low_counter, Mid_counter, and High_counter. The counter Low_counter may count photons having an energy band that corresponds to the threshold value Vth_low. The counter Mid_counter may count photons having an energy band that corresponds to the threshold value Vth_mid. The counter High_counter may count photons having an energy band that corresponds to the threshold value Vth_high.

When the counter 85 receives OUT_low="1" from the signal processor 83, the counter Low_counter counts the digital signal. When the counter 85 receives OUT_mid="1" from the signal processor 83, the counter Mid_counter counts the digital signal. When the counter 85 receives OUT_high="1" from the signal processor 83, the counter High_counter counts the digital signal. As described above, the three counters Low_counter, Mid_counter and High_counter of the counter 85 may receive and count the digital signals that are indicative of the different photon energy bands with respect to each photon energy band from the signal processor 83.

These counters Low_counter, Mid_counter and High_counter may be digital counters. Digital counters, which are circuits to count constant clock inputs in a predetermined order, may be classified into either up-counters or down-counters depending on the direction in which clock inputs are counted. For example, if the counters Low_counter, Mid_counter, and High_counter are up-counters, the counters Low_counter, Mid_counter and High_counter increase the count of photons by one whenever receiving a corresponding digital signal from the signal processor 83, and store the same. In another example, if the counter 85 receives OUT_low="1" from the signal processor 83 three times, the counter Low_counter counts the digital signal three times, and stores number "3".

Figure 9:
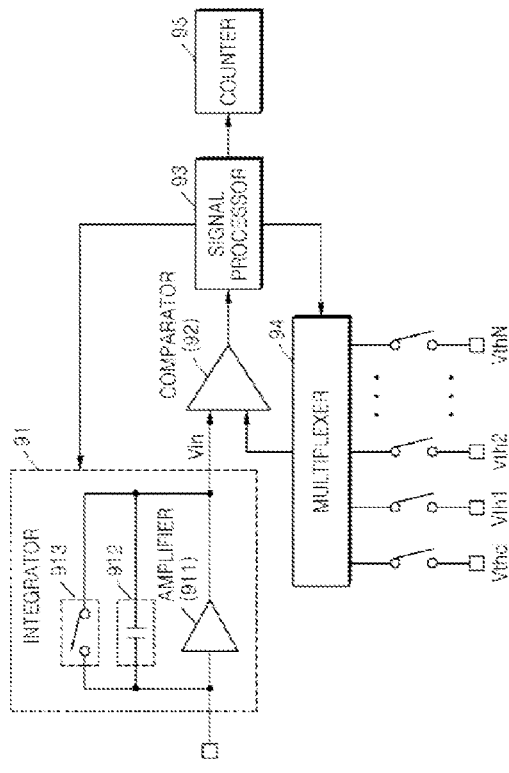
FIG. 9 is a circuit diagram illustrating an example of the readout circuit of FIG. 3.

FIG. 9 is a circuit diagram illustrating an example of the readout circuit 33 of FIG. 3, in which only some elements of the readout circuit 33 of FIG. 8 are illustrated. Therefore, although not explicitly described in the current example, any content described above in connection with the readout circuit 33 shall apply to the readout circuit of FIG. 8 according to the current example.

An integrator 91 may include an amplifier 911, a capacitor 912, and a switch 913. The amplifier 911 may be connected in parallel to the capacitor 912 and the switch 913. That is, the capacitor 912 and the switch 913 may be connected to both input and output terminals of the amplifier 911. When the amplifier 911 and the capacitor 912 are connected in parallel, a current input to the integrator 91 may fail to enter the amplifier 911 because of a high resistance at the input terminal of the amplifier 911. Thus, the current input may be accumulated in the capacitor 912. The charges accumulated in the capacitor 912 may lead to a voltage difference between the opposite terminals of the capacitor 912. The amplifier 912 may have a greater voltage level at the output terminal thereof than at the input terminal thereof by as much as the voltage difference at the opposite terminals of the capacitor 912.

A voltage (V(t)) at the opposite terminals of the capacitor 912 may be calculated using Equation 1 as follows:

$$V(t) = \frac{1}{C}\int_0^t I(\tau)d\tau + V(0) \qquad [\text{Equation 1}]$$

where C is an electrostatic capacity of the capacitor 912, I(τ) is a current input to the integrator 91, V(0) is an initial voltage of the capacitor 912, t is time of integration, and τ is a variable of integration.

The multiplexer 94, which may include as many switches as a number of threshold values, may sequentially output the threshold values to the comparator 92 by controlling operations of the switches. The switches may be respectively connected to external voltage sources. The external voltage sources may provide voltages having amplitudes corresponding to threshold values Vthd, from Vth1 to VthN. For example, if the number of threshold values is four, the four threshold values are represented by Vthd, Vth_low, Vth_mid, and Vth_high. The multiplexer 94 may switch on one of the switches according to a command from the counter 95 to output a voltage from the voltage source connected to that switch. For example, with the assumption that a first switch of the multiplexer 94 is connected to a voltage source that provides a voltage corresponding to the threshold value Vthd, if the first switch is switched on, the multiplexer 94 outputs the threshold value Vthd to the comparator 92.

Figure 10:
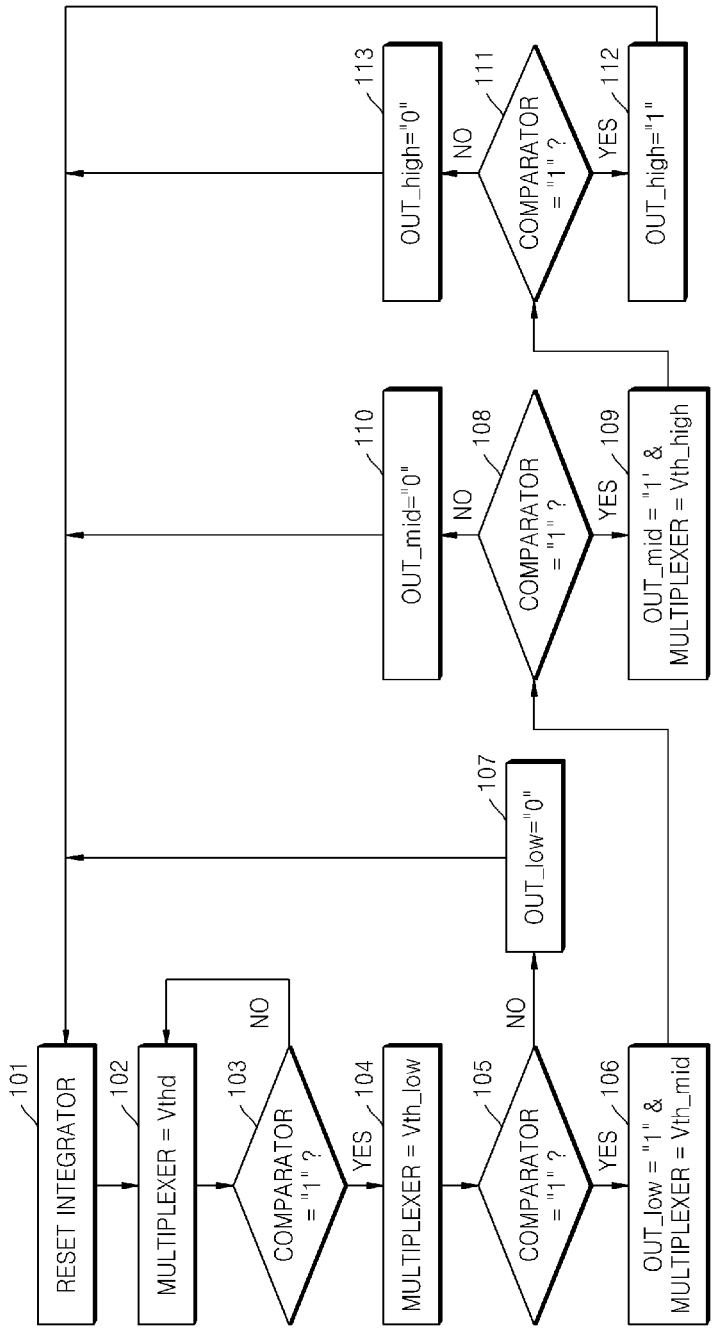
FIG. 10 is a flowchart illustrating an example of a method of distinguishing several energy bands of photons including processes that are performed in time series in the readout circuit of FIG. 8.

FIG. 10 is a flowchart illustrating an example of a method of distinguishing several energy bands of photons. Referring to FIG. 10, the method of distinguishing several energy bands of photons includes processes that are performed in time series in the readout circuit 33 of FIG. 8. Although not explicitly described below, any content described above in connection with the readout circuit 33 shall apply to the illustrated example of the method of distinguishing several energy bands of photons. A photon counting method using one comparator in the readout circuit 33 may include the following operations.

In operation 101, the signal processor 83 instructs the integrator 81 to be reset. In response to a reset command from the signal processor 83, the integrator 81 is reset to an initial state in which no signal is accumulated.

In operation 102, the signal processor 83 instructs the multiplexer 84 to output the threshold value Vthd to the comparator 82.

In operation 103, the signal processor 83 performs operation 104 if the result of a comparison received from the comparator 82 is "1", and operation 102 if the result of a comparison received from the comparator 82 is "0". If the result of the comparison the signal processor 83 has received from the comparator 82 is "1", the accumulated electric signal from the integrator 81 is greater than the threshold value Vthd. If the result of the comparison the signal processor 83 has received from the comparator 82 is "0", the accumulated electric signal from the integrator 81 is less than the threshold value Vthd.

In operation 104, the signal processor 83 instructs the multiplexer 84 to switch to the threshold value Vth_low from the threshold value Vthd. The multiplexer 84 switches from one threshold value to another according to a command from the signal processor 83, which is to be output to the comparator 82.

In operation 105, the signal processor 83 performs operation 106 if the result of a comparison received from the comparator 82 is "1", and operation 107 if the result of the comparison received from the comparator 82 is "0". If the result of the comparison the signal processor 83 has received from the comparator 82 is "1", the accumulated electric signal from the integrator 81 is greater than the threshold value Vth_low. If the result of the comparison the signal processor 83 has received from the comparator 82 is "0", the accumulated electric signal from the integrator 81 is less than the threshold value Vth_low.

In operation 106, the signal processor 83 outputs a digital signal OUT_low="1" to the counter 85, and instructs the multiplexer 84 to switch to a next threshold value Vth_mid. The signal processor 83 outputs the digital signal OUT_low="1" to the counter 85 to enable counting by the counter Low_counter in the counter 85. The signal processor 83 instructs the multiplexer 84 to switch to and output a next threshold value Vth_mid to the comparator 82. In operation 108, the comparator 82 compares the accumulated electric signal from the integrator 81 with the threshold value Vth_mid.

In operation 107, the signal processor 83 outputs a digital signal OUT_low="0" to the counter 85, and returns to operation 101. When the signal processor 83 outputs the digital signal OUT_low="0" to the counter 85, the counter 85 does not perform counting.

In operation 108, the signal processor 83 performs operation 109 if the result of the comparison received from the comparator 82 is "1", and operation 110 if the result of the comparison received from the comparator 82 is "0". If the result of the comparison the signal processor 83 has received from the comparator 82 is "1", the accumulated electric signal from the integrator 81 is greater than the threshold value Vth_mid. If the result of the comparison the signal processor 83 has received from the comparator 82 is "0", the accumulated electric signal from the integrator 81 is less than the threshold value Vth_mid.

In operation 109, the signal processor 83 outputs a digital signal OUT_mid="1" to the counter 85, and instructs the multiplexer 84 to switch to a next threshold value Vth_high. The signal processor 83 outputs the digital signal OUT_mid="1" to the counter 85 to enable counting by the counter Mid_counter in the counter 85. The signal processor 83 instructs the multiplexer 84 to switch to and output a next threshold value Vth_high to the comparator 82. In operation 111, the comparator 82 compares the accumulated electric signal from the integrator 81 with the threshold value Vth_high.

In operation 110, the signal processor 83 outputs a digital signal OUT_mid="0" to the counter 85, and returns to operation 101. When the signal processor 83 outputs the digital signal OUT_mid="0" to the counter 85, the counter 85 does not perform counting.

In operation 111, the signal processor 83 performs operation 112 if the result of the comparison received from the comparator 82 is "1", and operation 113 if the result of the comparison received from the comparator 82 is "0". If the result of the comparison the signal processor 83 has received from the comparator 82 is "1", the accumulated electric signal from the integrator 81 is greater than the threshold value Vth_high. If the result of the comparison the signal processor 83 has received from the comparator 82 is "0", the accumulated electric signal from the integrator 81 is less than the threshold value Vth_high.

In operation 112, the signal processor 83 outputs a digital signal OUT_high="1" to the counter 85, and returns to operation 101. The signal processor 83 outputs the digital signal OUT_high="1" to the counter 85 to enable counting by the counter High_counter in the counter 85.

In operation 113, the signal processor 83 outputs a digital signal OUT_high="0" to the counter 85, and returns to operation 101. When the signal processor 83 outputs the digital signal OUT_high="0" to the counter 85, the counter 85 does not perform counting.

The signal processor 83 may control the above described processes to enable sequential comparisons of the accumulated electric signal from the integrator 81 with several threshold values so that the results of the comparisons are output to the counter 85.

Figure 11:
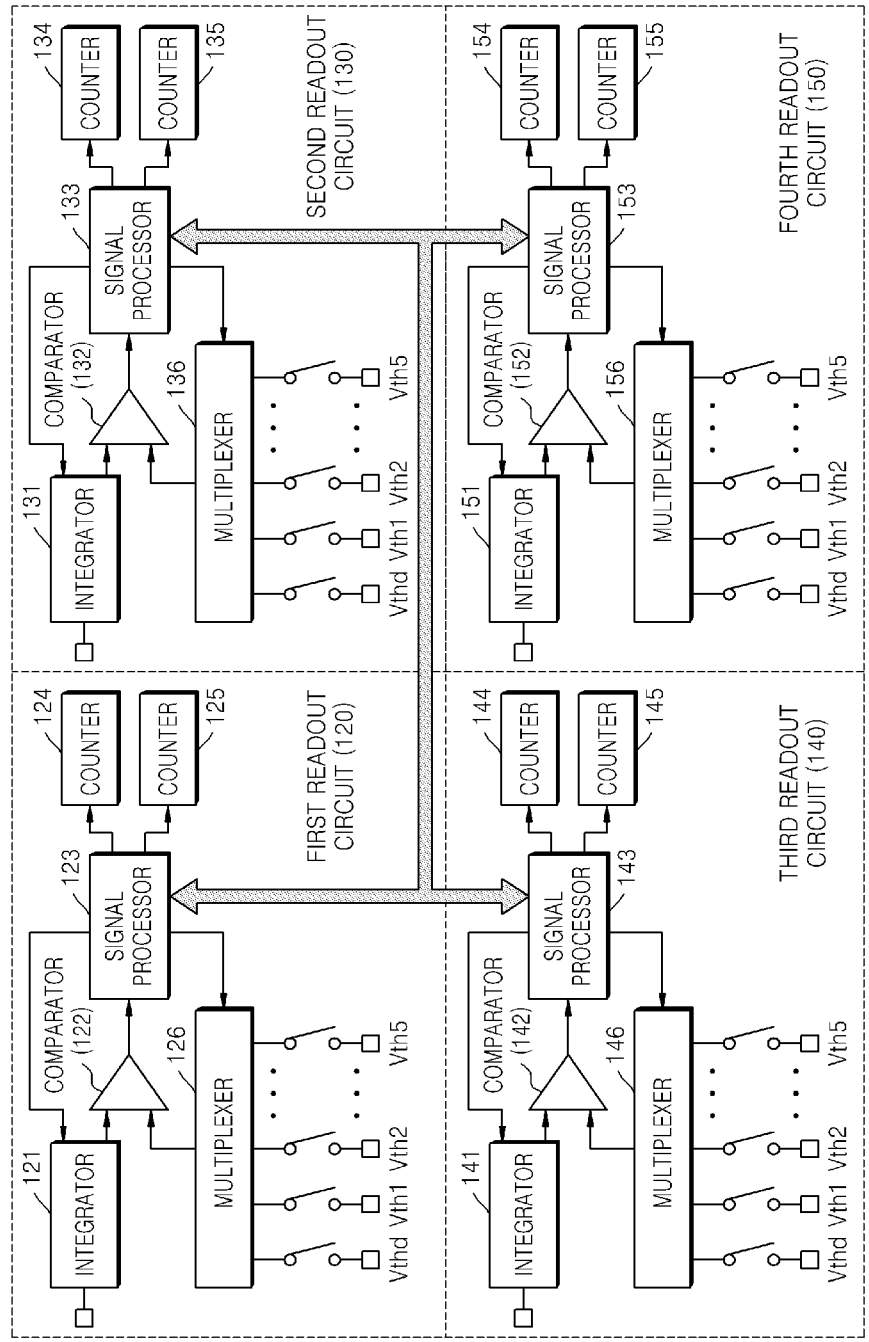
FIG. 11 is a circuit schematic diagram illustrating another example of a photon counting detector in which readout circuits, an example of which is illustrated in FIG. 9, share counters.

FIG. 11 is a circuit schematic diagram illustrating another example of a photon counting detector, in which readout circuits, an example of which is illustrated in FIG. 9, share counters. The example of FIG. 11 includes first to fourth readout circuits 120-150, each having the same structure as the readout circuit of FIG. 9, instead of the first to fourth readout circuits 61-64 in the embodiment of FIG. 6, but the technical feature of the embodiment of FIG. 6 that the first to fourth readout circuits 61-64 share counters may apply to the present embodiment of FIG. 11. Thus, although not explicitly described in the example, any content described above in connection with the example of FIG. 6 shall apply to the embodiment of FIG. 11.

Referring to FIG. 11, signal processors 123, 133, 143, and 153 of the first to fourth readout circuits 120, 130, 140, and 150 may receive results of comparisons between each threshold value and an accumulated electric signal from a corresponding integrator 121, 131, 141, and 151, and output digital signals that are indicative of the energy bands of photons to counters 124, 125, 134, 135, 144, 145, 154, and 155, or the signal processors 123, 133, 143, and 153 of the first to fourth readout circuits 120-150.

According to counting requirements, the signal processors 123, 133, 143, and 153 of the first to fourth readout circuits 120, 130, 140, and 150 may output digital signals to the counter(s) in their own readout circuits or to the counter(s) in the other readout circuits. For example, the signal processor 123 of the first readout circuit 120 may receive results of a comparison of threshold values and an accumulated electric signal received from an integrator 121 from a comparator 122, and output corresponding digital signals to one of the counters 124 and 125 of the first readout circuit 120 if required, or any appropriate counter of the second to fourth readout circuits 130, 140, and 150.

The first to fourth readout circuits 120-150 may each include two counters of which one is shared with the other readout circuits 120-150. For example, the first readout circuit 120 may include the counters 124 and 125, wherein the counter 125 may be shared with the second to fourth readout circuits 130-150. The counters 124, 134, 144, and 154 of the first to fourth readout circuits 120-150 may each count photons in a particular energy band that correspond to one of the threshold values Vth1-Vth5.

The counters 124, 134, 144, and 154 may correspond to the same threshold value. For example, if the counter 124 of the first readout circuit 120 counts photons in an energy band that corresponds to the threshold value Vth1, the counters 134, 144, and 154 of the second to fourth readout circuits 130-150 may count the photons in the energy band that corresponds to the threshold value Vth1. The counters 125, 135, 145, and 155 of the first to fourth readout circuits 120-150 may respectively correspond to the other different threshold values excluding the threshold value Vth1 that corresponds to the counters 124, 134, 144, and 154. For example, if the counters 124, 134, 144, and 154 correspond to the threshold value Vth1, the counter 125 of the first readout circuit 120, the counter 135 of the second readout circuit 130, the counter 145 of the third readout circuit 140, and the counter 155 of the fourth readout circuit 150 may correspond to the threshold values Vth2, Vth3, Vth4, and Vht5, respectively. Among the photons detected by sensors that correspond to the first to fourth readout circuits 120-150, photons in an energy band that corresponds to the threshold value Vth2 are counted by the counter 125 of the first readout circuit 120 among the four readout circuits 120-150, photons in an energy band that corresponds to the threshold value Vth3 are counted by the counter 135 of the second readout circuit 130, photons in an energy band that corresponds to the threshold value Vth4 are counted by the counter 145 of the third readout circuit 140, and photons in an energy band that corresponds to the threshold value Vth5 are counted by the counter 155 of the fourth readout circuit 150.

Using the structure of the readout circuit illustrated in FIG. 9, each readout circuit may include only one comparator, and the other neighboring readout circuits may share the counters 125, 135, 145, and 155. Thus, compared with a related aspect when separate counters are used for different energy bands of photons, the example herein may use a reduced number of counters, which may enable sizes of the readout circuits to be reduced.

Figure 12:
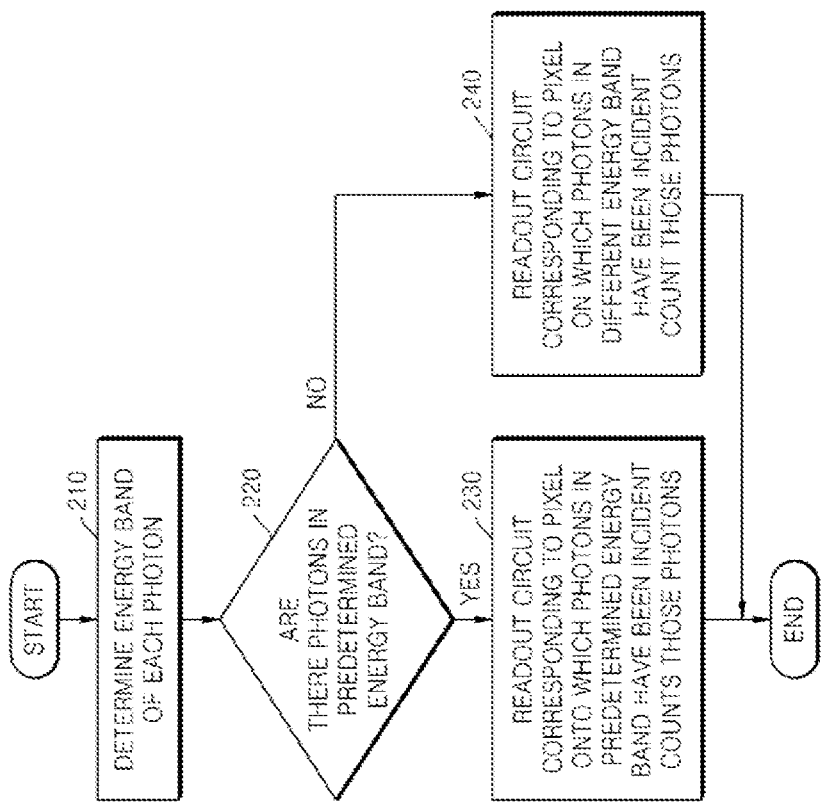
FIG. 12 is a flowchart illustrating an example of a photon counting and detecting method.

FIG. 12 is a flowchart illustrating an example of a photon counting and detecting method. Referring to FIG. 12, the method uses the photon counting detector 11 and includes determining (operation 210) an energy band of each photon. Then, a determination (operation 220) is made as to whether photons are in a predetermined energy band. If there are photons in a predetermined energy band, the photons in the predetermined energy band are counted (operation 230) in a readout circuit that corresponds to a pixel to which the photons have been incident. If there are photons in different energy bands excluding the predetermined energy band, the photons in the different energy bands are counted (operation 240) respectively in readout circuits that correspond to pixels to which the photons in the different energy bands have been incident.

Each readout circuit of the photon counting detector 11 includes a first counter to count the photons in the predetermined energy band, so that any readout circuit that corresponds to a pixel to which the photons in the predetermined energy band have been incident counts the photons. However, the photons in the different energy bands excluding the predetermined energy band are respectively counted by the N×N readout circuits that correspond to the N×N pixels to which the photons in the different energy bands have been incident.

The other different energy bands may respectively correspond to the N×N readout circuits. Thus, if there are photons in a different energy band and not in the predetermined energy band, one of the N×N readout circuits that corresponds to that energy band may count the photons in the different energy band. For example, the N×N readout circuits may count photons in the energy bands that correspond to the first to fifth threshold values. The photons in an energy band that corresponds to the first threshold value may be counted in each of the N×N readout circuits, while the photons in the other different energy bands that correspond to the second to fifth threshold values may be counted respectively in one of the N×N readout circuits. That is, one of the N×N readout circuits may count photons in an energy band that corresponds to the second threshold value, and another readout circuit may count photons in an energy band that corresponds to the third threshold value. Still other readout circuits, excluding the readout circuits that count the photons in the second and third threshold values, may count photons in energy bands that correspond to the fourth and fifth threshold values, respectively.

For example, referring to FIG. 12, in operation 210, the photon counting detector 11 determines the energy band of each photon incident to a sensor. The photon counting detector 11 may determine the energy band of each photon by using a plurality of comparators that compare an electric signal converted by the sensor with a plurality of threshold signals, respectively. That is, the electric signal converted by the sensor may be compared with a particular threshold value, and amplitude of the electric signal converted by the sensor may be determined based on a result of the comparison indicating that amplitude of the electric signal is greater or less than the threshold value. Once amplitude of the electric signal converted by the sensor has been determined, the energy band of each photon incident onto the sensor may be determined based on amplitude of the electric signal. In other examples, the photon counting detector 11 may determine the energy band of each photon by using one comparator that sequentially compares the electric signal converted by the sensor with a plurality of threshold values. For example, one comparator may compare the electric signal converted by the sensor several times with the different threshold values in sequence, thereby determining amplitude of the electric signal converted by the sensor to be between certain threshold values. The energy band of each photon incident to the sensor is determined according to the determined amplitude of the electric signal.

In operation 220, the photon counting detector 11 determines if the energy band of each photon is a predetermined energy band. If the energy band of each photon is a predetermined energy band, the process goes to operation 230. Otherwise, the process goes to operation 240.

If the energy band of each photon is the predetermined energy band, amplitude of the electric signal converted by the sensor may be greater than a first threshold value. In this case, the predetermined energy band may be referred to as a first energy band. When determining the energy band of each photon using a plurality of comparators, if a first comparator outputs a result of a comparison indicating that amplitude of the electric signal converted by the sensor is greater than the first threshold value, the photon may have a first energy band. When determining the energy band of each photon using one comparator, if the comparator outputs a result of the comparison indicating that amplitude of the electric signal converted by the sensor is greater than the first threshold value as a result of comparing the first threshold value with the electric signal converted by the sensor, the photon may have a first energy band. If there are photons in the other different energy bands, excluding the first energy band, results of comparisons are output from some of the plurality of comparators that compare amplitude of the electric signal with threshold values other than the first threshold value. When one comparator is used, a result of a comparison between the electric signal and another threshold value, excluding the first threshold value, is output.

In operation 230, the photons in the predetermined energy band are counted in each readout circuit of the photon counting detector 11 that corresponds to pixels to which the photons have been incident. Since any readout circuit of the photon counting detector 11 is able to count the photons in the predetermined energy band, readout circuits may count those photons that correspond to pixels to which the photons in the predetermined energy band have been incident.

In operation 240, photons in a different energy band, excluding the predetermined energy band, are counted in one of the N×N readout circuits of the photon counting detector 11 that correspond to N×N pixels, including the pixel to which the photons in the different energy band have been incident. Since the N×N readout circuits are able to count photons in different energy bands, excluding the predetermined energy band, respectively, only one of the readout circuits to count the photons in a corresponding different energy band may count those photons in the different energy band. Thus, if the different energy band of photons is determined, the photons in the different energy band are output to one of the N×N readout circuits that is responsible to count photons in the corresponding energy band. The N×N readout circuits count photons in the different energy bands, excluding the predetermined energy band, respectively. The N×N readout circuits may include counters to count photons in different energy bands, excluding the predetermined energy band, respectively. In other words, each of the N×N readout circuits may not need to include a plurality of counters to count photons in the entire energy bands, respectively. This may contribute to reducing the size of the photon counting detector 11.

Through the above-described operations, if photons in a predetermined energy band are incident to a pixel, the photons in the predetermined energy band may be counted in a readout circuit that corresponds to the pixel to which the photons in the predetermined energy band have been incident. If photons in a different energy band, not the predetermined energy band, are incident to a pixel, the photons are counted in one of the N×N readout circuits that correspond to the N×N pixels including the pixel to which the photons in the different energy band have been incident, where the readout circuit performing the photon counting includes a counter to count the photons in the different energy band. Therefore, the N×N readout circuits may output the photon counts in the predetermined energy band and the other different energy bands, excluding the predetermined energy, at the same time. The photons in the predetermined energy band may be counted in any of the readout circuits, so that a high-resolution image may be generated. The photons in the other different energy bands, excluding the predetermined energy band, may be separately counted in the N×N readout circuits, respectively, so that a plurality of images from the different photon energy bands may be generated, and a high-contrast image may be generated using the above-referenced plurality of images.

As described in the above examples, since any of the readout circuits that correspond to the entirety of pixels of a region onto which multi-energy radiation is irradiated are able to count photons in a predetermined energy band in multi-energy radiation, a high-resolution image may be generated based on the photon count in the predetermined energy band from the readout circuits. Some of the readout circuits that correspond to some of the pixels in the region onto which multi-energy radiation is irradiated selectively and respectively count photons in one or more different energy bands excluding the predetermined energy band, so that a high-contrast image may be generated based on the photo counts in the different energy band(s).

Furthermore, the different energy bands of photons in multi-energy radiation may be distinguished using only one comparator, so that a photon counting detector may have a reduced size. Therefore, by using the small-sized photon counting detector, a high-resolution image may be generated based on the results of counting the photons in the different energy bands.

The above-described method may be written as program instructions to perform the method described herein, or one or more operations thereof. Program instructions to perform the method described herein, or one or more operations thereof may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. In addition, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. In addition, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A photon counting detector, comprising:
readout circuits configured to count photons in multi-energy radiation incident to a sensor, the photons being counted with respect to each of a plurality of energy bands of the multi-energy radiation, the readout circuits respectively corresponding to pixels of a region onto which the multi-energy radiation is irradiated, each of the readout circuits being configured to count photons in a first predetermined energy band, and at least one of the readout circuits being configured to receive, from all of the readout circuits, comparison results based on an n-th predetermined energy band, and count photons of the n-th predetermined energy band.

2. The photon counting detector of claim 1, wherein at least one of the readout circuits is divided into N×N readout circuits that correspond to N×N pixels, respectively, each of the N×N readout circuits comprising a first counter configured to count the photons in the first predetermined energy band, and a second counter configured to count the photons in the n-th predetermined energy band, and each of the N×N readout circuits being configured to count the photons in the n-th predetermined energy band, using the second counter.

3. The photon counting detector of claim 2, wherein each of the N×N readout circuits further comprises a comparing unit configured to compare an electric signal converted by the sensor with a plurality of threshold values,
   wherein the first counter is configured to count the photons in the first predetermined energy band based on a result of a comparison between the electric signal and a first threshold value from a first comparator of the comparing unit, and
   wherein the second counter is configured to count the photons in the n-th energy band based on a plurality of results of a comparison between the electric signal and a n-th threshold value, the second counter receiving the plurality of results of the comparison from a second comparator of the comparing unit of each of the N×N readout circuits.

4. The photon counting detector of claim 3, wherein the second counter counts the photons until a result of a comparison is received indicating that the electric signal converted by the sensor has amplitude that is greater than amplitude of the n-th threshold value.

5. The photon counting detector of claim 3, wherein each of the N×N readout circuits further comprises a logic circuit configured to perform a logic operation using the plurality of results of the comparison with the n-th threshold value, and output a result of the logic operation to the second counter, and
   wherein the second counter counts the photons based on the result of the logic operation from the logic circuit.

6. The photon counting detector of claim 5, wherein the logic circuit is an OR gate.

7. The photon counting detector of claim 2, wherein each of the N×N readout circuits further comprises:
   an integrator configured to accumulate an electric signal received from the sensor that has undergone photoelectric conversion from a corresponding one of the photons;
   a comparator configured to compare the accumulated electric signal from the integrator with one of a plurality of threshold values; and
   a signal processor configured to instruct sequential switching from the one of the threshold values to another one of the threshold values according to a result of the comparing, and output digital signals that distinguish the energy bands of the photons based on results of sequential comparisons with the threshold values from the comparator,
   wherein the first counter counts the photons in the first predetermined energy bands based on a digital signal received from the signal processor that is indicative of a result of a comparison with a first threshold value of the threshold values, and
   wherein the second counter counts the photons in the predetermined energy band based on a digital signal received from the signal processor that is indicative of a result of a comparison with an n-th threshold value of the threshold values.

8. The photon counting detector of claim 7, wherein the signal processor is further configured to receive results of comparisons with the n-th threshold value from signal processors of other N×N readout circuits, and output the received results of the comparisons to the second counter.

9. The photon counting detector of claim 7, wherein the signal processor is further configured to perform a logic operation using results of comparisons with the n-th threshold value received from signal processors of other N×N readout circuits, and output a result of the logic operation to the second counter.

10. The photon counting detector of claim 9, wherein the logic operation is an OR operation.

11. A photon counting and detecting method in readout circuits to count photons in multi-energy radiation incident to a sensor, the photons being counted with respect to each of a plurality of energy bands of the multi-energy radiation, the method comprising:
    determining an energy band of a photon;
    in response to the determined energy band of the photon being a first predetermined energy band, counting the photon in one of the readout circuits that corresponds to a pixel to which the photon has been incident; and
    in response to the determined energy band of the photon being an n-th predetermined energy band, receiving, from all of the readout circuits, comparison results based on the n-th predetermined energy band, and counting the photon of the n-th predetermined energy band.

12. The photon counting method of claim 11, wherein at least one of the readout circuits is divided into N×N readout circuits that correspond to N×N pixels, respectively,
    wherein the counting of the photon comprises counting the photon in one of the readout circuits that corresponds to the pixel to which the photon has been incident if the one of the readout circuits comprises a counter that counts the photon of the n-th predetermined energy band, and
    wherein the counting of the photon further comprises outputting a result of the determining of the energy band to one of the N×N readout circuits comprising the counter, if the one of the readout circuits does not have the counter.

13. The method of claim 11, wherein the determining of the energy band comprises comparing an electric signal received by the sensor with a plurality of threshold values.

14. The method of claim 11, wherein the counting of the photon is based on a result of a comparison with a first threshold value of a plurality of threshold values.

15. The method of claim 14, wherein at least one of the readout circuits is divided into N×N readout circuits that correspond to N×N pixels, respectively, and
    wherein the counting of the photon is based on a result of a logic operation using results of comparisons with a second threshold value of the threshold values, the results of the comparisons being output from the N×N readout circuits.

16. The method of claim 15, wherein the logic operation is an OR operation.

17. The method of claim 11, wherein the counting of the photon is based on a result of a comparison with a second threshold value of a plurality of threshold values.

18. The method of claim 11, wherein the determining of the energy band comprises:
    accumulating an electric signal received from the sensor that has undergone photoelectric conversion from a corresponding photon;
    comparing the accumulated electric signal with one of a plurality of threshold values;
    instructing sequential switching from the one of the plurality of threshold values to another of the threshold values according to a result of the comparing of the accumulated electric signal; and outputting digital signals that distinguish the energy band of the photon based on results of sequential comparisons with the plurality of threshold values.

19. The method of claim 18, wherein the counting of the photon is performed in response to the accumulated electric signal having amplitude that is greater than amplitude of a first threshold value of the plurality of threshold values.

20. The method of claim 18, wherein the counting of the photon is performed in response to the accumulated electric signal having amplitude that is greater than amplitude of a second threshold value of the plurality of threshold values.

21. The method of claim 18, wherein at least one of the readout circuits is divided into N×N readout circuits that correspond to N×N pixels, respectively, and wherein the counting of the photon is based on a result of a logic operation using results of comparisons with a second threshold value of the threshold values, the results of the comparisons being output from the N×N readout circuits.

22. A photon counting detector, comprising:

l number of readout circuits, each of which is configured to count photons in multi-energy radiation incident to a sensor, the readout circuits comprising m number of first and n-th comparators disposed in respective readout circuits, each of the first comparators configured to compare photons converted by the sensor with a first threshold, and each of the n-th comparators configured to compare the photons with a n-th threshold;

l number of primary counters disposed in respective readout circuits, each of the primary counters configured to count the photons based on the first threshold; and m−1 number of secondary counters disposed in at least one of the readout circuits, each of the secondary counters configured to count the photons based on the n-th threshold.

* * * * *